(12) United States Patent
Steenackers et al.

(10) Patent No.: US 10,286,707 B2
(45) Date of Patent: May 14, 2019

(54) LASER MARKABLE COMPOSITIONS, MATERIALS AND DOCUMENTS

(71) Applicant: AGFA-GEVAERT, Mortsel (BE)

(72) Inventors: Marin Steenackers, Mortsel (BE); Johan Loccufier, Mortsel (BE); Fabienne Goethals, Mortsel (BE); Lionel Petton, Mortsel (BE)

(73) Assignee: AGFA-GEVAERT, Mortsel (BE)

( * ) Notice: Subject to any disclaimer, the term of this patent is extended or adjusted under 35 U.S.C. 154(b) by 0 days.

(21) Appl. No.: 15/574,251

(22) PCT Filed: May 19, 2015

(86) PCT No.: PCT/EP2015/061007
§ 371 (c)(1),
(2) Date: Nov. 15, 2017

(87) PCT Pub. No.: WO2016/184504
PCT Pub. Date: Nov. 24, 2016

(65) Prior Publication Data
US 2018/0141364 A1   May 24, 2018

(51) Int. Cl.
| | |
|---|---|
| *B41M 5/46* | (2006.01) |
| *B41M 5/323* | (2006.01) |
| *B41M 3/14* | (2006.01) |
| *B41M 5/337* | (2006.01) |
| *B41M 5/34* | (2006.01) |
| *B41M 5/28* | (2006.01) |
| *B41M 5/333* | (2006.01) |
| *B41M 5/41* | (2006.01) |
| *C09D 11/328* | (2014.01) |

(52) U.S. Cl.
CPC ............ *B41M 5/323* (2013.01); *B41M 3/142* (2013.01); *B41M 5/287* (2013.01); *B41M 5/333* (2013.01); *B41M 5/337* (2013.01); *B41M 5/34* (2013.01); *B41M 5/41* (2013.01); *B41M 5/465* (2013.01); *C09D 11/328* (2013.01); *B41M 2205/04* (2013.01)

(58) Field of Classification Search
CPC ........ B41M 3/14; B41M 3/142; B41M 5/323; B41M 5/333; B41M 5/337; B41M 5/46; B41M 5/465; B41M 2205/04; B41J 2/44; B41J 2/442; B42D 25/382; B42D 25/387
USPC .................................................. 503/204, 209
See application file for complete search history.

(56) References Cited

U.S. PATENT DOCUMENTS 4,720,449 A    1/1988   Borror et al.

FOREIGN PATENT DOCUMENTS

| EP | 0 279 104 A1 | 8/1988 |
| EP | 0 734 870 A2 | 10/1996 |
| EP | 2 181 858 A1 | 5/2010 |
| EP | 2 567 825 A1 | 3/2013 |
| EP | 2 719 540 A1 | 4/2014 |

(Continued)

OTHER PUBLICATIONS

Official Communication issued in International Patent Application No. PCT/EP2015/061007, dated Dec. 21, 2015.

*Primary Examiner* — Bruce H Hess
(74) *Attorney, Agent, or Firm* — Keating and Bennett, LLP

(57) ABSTRACT

A color laser markable composition includes at least a first and a second Diffusion Hindered Molecular Assembly (DHMA), each including a leuco dye and, respectively, a first and second sensitizer. With the laser markable composition, at least two different colors may be formed in a single layer.

12 Claims, 2 Drawing Sheets

(56) References Cited

FOREIGN PATENT DOCUMENTS

EP 2 719 541 A1 4/2014
EP 2 648 920 B1 3/2015

LASER MARKABLE COMPOSITIONS, MATERIALS AND DOCUMENTS

CROSS REFERENCE TO RELATED APPLICATIONS

This application is a 371 National Stage Application of PCT/EP2015/061007, filed May 19, 2015, which is incorporated by reference herein in its entirety.

BACKGROUND OF THE INVENTION

1. Field of the Invention

This invention relates to laser markable compositions and articles made therefrom, in particular to colour laser markable security documents.

2. Description of the Related Art

Security cards are widely used for various applications such as identification purposes (ID cards) and financial transfers (credit cards). Such cards typically consist of a laminated structure consisting of various paper or plastic laminates and layers wherein some of them may carry alphanumeric data and a picture of the card holder. So called 'smart cards' can also store digital information by including an electronic chip in the card body. A principal objective of such security cards is that they cannot be easily modified or reproduced in such a way that the modification or reproduction is difficult to distinguish from the original.

Two techniques frequently used for preparing security documents are laser marking and laser engraving. In literature, laser engraving is often incorrectly used for laser marking. In laser marking, a colour change is observed by local heating of material, while in laser engraving material is removed by laser ablation.

Well known in the field of laser markable security documents is the use of laser markable polymeric supports. Laser marking produces a colour change from white to black in a laser markable support through carbonization of the polymer, usually polycarbonate as disclosed in e.g. EP-A 2181858.

During the past last years, there is an increased interest of using laser markable layers. The advantage of using a laser markable layer coated on a support instead of a laser markable support, is that a support can be used which has better physical properties than the laser markable supports, such as for example a higher flexibility than a polycarbonate support as disclosed in e.g. EP-A 2567825.

There is also an increased interest in using laser marking to produce coloured images, for example in security documents, but also in various other applications. Therefore, laser markable layers are used which are composed of colour forming compounds (also called "leuco-dyes") which can change from essentially colourless or pale-coloured to coloured when exposed to for example heat, such as disclosed in for example EP-A 2648920.

The colour laser markable layers may comprise an infrared absorbing dye (IR dye) or an infrared absorbing pigment (IR pigment), both absorbing the IR radiation and converting it into heat.

An advantage of using IR dyes is that the absorption spectrum of an IR dye tends to be narrower than that of an IR pigment. This allows the production of multicoloured articles and security documents from precursors having a plurality of laser markable layers containing different IR dyes and colour forming compounds. The IR dyes having a different maximum absorption wavelength can then be addressed by IR lasers with corresponding emmision wavelengths causing colour formation only in the laser markable layer of the addressed IR dye. Such multicolour articles have been disclosed in for example U.S. Pat. No. 4,720,449, EP-A 2719540 and EP-A 2719541.

A problem of colour laser markable materials comprising an IR dye and a leuco dye is often their poor daylight stability. When such materials, for example security documents, are exposed to daylight for a long time, a background stain becomes more and more pronounced.

Another disadvantage of colour laser markable materials disclosed in for example EP-A 2719541 is the fact that the colour laser markable layers comprising a leuco dye and an IR dye are prepared from non-aqueous coating solutions making their production more cumbersome regarding health and safety regulations.

Still another disadvantage of such colour laser markable materials is their multilayer structure. The materials typically have three laser markable layers, one layer for each colour, and usually also intermediate layers between the laser markable layers to prevent colour contamination. Such a build-up makes their preparation complex and therefore economically less viable. Also, the physical properties of such a complex material may be negatively influenced by a lesser adhesion between two, or more, of the multiple layers making up the material.

SUMMARY OF THE INVENTION

Preferred embodiments of the invention provide a colour laser markable article having a simplified and more environmently friendly preparation method while maintaining or even improving their physical properties and daylight stability.

These advantages and benefits have been realized with the colour laser markable composition defined below.

Further advantages and embodiments of the present invention will become apparent from the following description.

BRIEF DESCRIPTION OF THE DRAWINGS

FIG. 1 shows a cross section of an embodiment of a laser markable article wherein a single laser markable layer (10) comprising two DHMA's (20 and 30) containing respectively a sensitizer S-1 and
S-2 and a leuco-dye LD-1 and LD-2. With this embodiment, two different colours may be produced in a single layer.

FIG. 2 shows a cross section of an embodiment of a laser markable article wherein a laser markable layer (10) comprising three DHMA's (20, 30 and 40) containing respectively a sensitizer S-1, S-2 and S-3 and a leuco-dye LD-1, LD-2 and LD-3. With this embodiment, three different colours may be produced in a single layer.

FIG. 3 shows a cross section of an embodiment of a laser markable article wherein two laser markable layers (10 and 50) are used. The first laser markable layer (10) comprises two DHMA's (20 and 30) containing respectively a sensitizer S-1 and S-2 and a leuco-dye LD-1 and LD-2. The second laser markable layer (50) comprises a third DHMA

Figure 1:
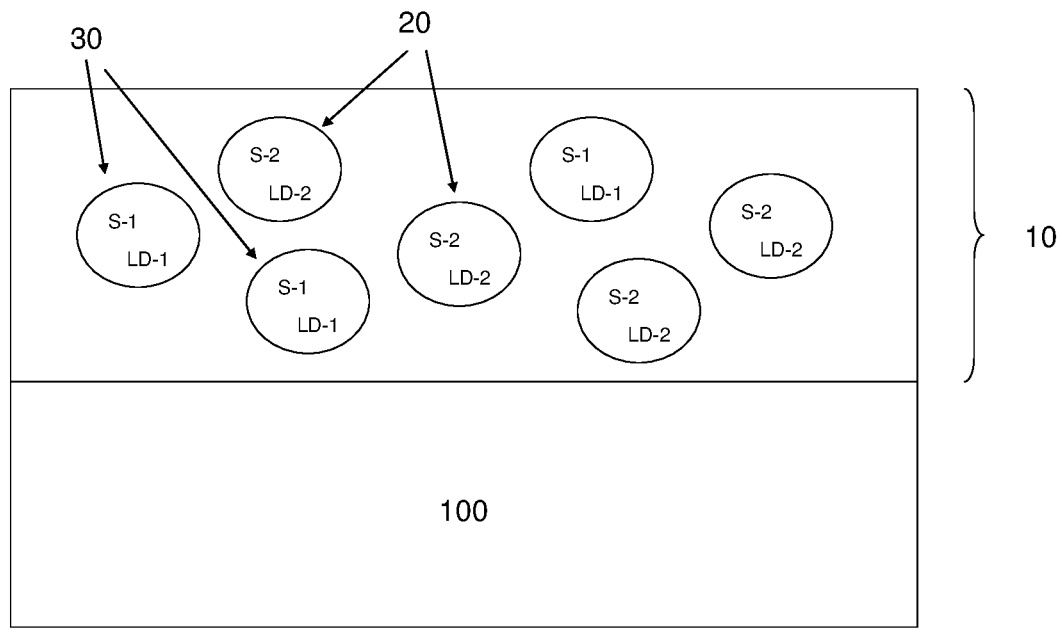
In FIGS. 1 to 3 the following numbering is adhered to:
10, 50=laser markable layer;
20, 30, and 40=DHMA containing respectively a sensitizer S-1, S-2 and S-3 and a leuco-dye LD-1, LD-2 and LD-3;
100=a support.

(40) containing a sensitizer S-3 and a leuco-dye LD-3. With this embodiment, three different colours may be produced in a two layers.

DETAILED DESCRIPTION OF THE PREFERRED EMBODIMENTS

Definitions

The terms polymeric support and foil, as used herein, mean a self-supporting polymer-based sheet, which may be associated with one or more adhesion layers, e.g. subbing layers. Supports and foils are usually manufactured through extrusion.

The term layer as used herein, is considered not to be self-supporting and is manufactured by coating or spraying it on a (polymeric) support or foil.

The term leuco dye as used herein refers to compounds which can change from essentially colourless or pale-coloured to coloured when irradiated with UV light, IR light and/or heated.

PET is an abbreviation for polyethylene terephthalate.

PETG is an abbreviation for polyethylene terephthalate glycol, the glycol indicating glycol modifiers which are incorporated to minimize brittleness and premature aging that occur if unmodified amorphous polyethylene terephthalate (APET) would be used in the production of cards.

PET-C is an abbreviation for crystalline PET, i.e. a biaxially stretched polyethylene terephthalate. Such a polyethylene terephthalate support has excellent properties of dimensional stability.

The definitions of security features correspond with the normal definition as adhered to in the Glossary of Security Documents—Security features and other related technical terms as published by the Consilium of the Council of the European Union on Aug. 25, 2008 (Version: v.10329.02.b.en) on its website: http://www.consilium.europa.eu/prado/EN/glossaryPopup.html.

The term security document precursor as used herein refers to the fact that one or more security features still have to be applied to the precursor, for example laser marking, in order to obtain the final security document.

The term alkyl means all variants possible for each number of carbon atoms in the alkyl group i.e. methyl, ethyl, for three carbon atoms: n-propyl and isopropyl; for four carbon atoms: n-butyl, isobutyl and tertiary-butyl; for five carbon atoms: n-pentyl, 1,1-dimethyl-propyl, 2,2-dimethyl-propyl and 2-methyl-butyl etc.

The term alkoxy means all variants possible for each number of carbon atoms in the alkyl group i.e. methoxy, ethoxy, for three carbon atoms: n-propoxy and isopropoxy; for four carbon atoms: n-butoxy, isobutoxy and tertiary-butoxy etc.

The term aryloxy means Ar—O— wherein Ar is an optionally substituted aryl group.

Unless otherwise specified a substituted or unsubstituted alkyl group is preferably a $C_1$ to $C_6$-alkyl group.

Unless otherwise specified a substituted or unsubstituted alkenyl group is preferably a $C_2$ to $C_6$-alkenyl group.

Unless otherwise specified a substituted or unsubstituted alkynyl group is preferably a $C_2$ to $C_6$-alkynyl group.

Unless otherwise specified a substituted or unsubstituted aralkyl group is preferably a phenyl group or a naphthyl group including one, two, three or more $C_1$ to $C_6$-alkyl groups.

Unless otherwise specified a substituted or unsubstituted alkaryl group is preferably a $C_1$ to $C_6$-alkyl group including an aryl group, preferably a phenyl group or naphthyl group.

Unless otherwise specified a substituted or unsubstituted aryl group is preferably a substituted or unsubstituted phenyl group or naphthyl group.

A cyclic group includes at least one ring structure and may be a monocyclic- or polycyclic group, meaning one or more rings fused together.

A heterocyclic group is a cyclic group that has atoms of at least two different elements as members of its ring(s). The counterparts of heterocyclic groups are homocyclic groups, the ring structures of which are made of carbon only. Unless otherwise specified a substituted or unsubstituted heterocyclic group is preferably a five- or six-membered ring substituted by one, two, three or four heteroatoms, preferably selected from oxygen atoms, nitrogen atoms, sulphur atoms, selenium atoms or combinations thereof.

An alicyclic group is a non-aromatic homocyclic group wherein the ring atoms consist of carbon atoms.

The term heteroaryl group means a monocyclic- or polycyclic aromatic ring comprising carbon atoms and one or more heteroatoms in the ring structure, preferably, 1 to 4 heteroatoms, independently selected from nitrogen, oxygen, selenium and sulphur. Preferred examples of heteroaryl groups include, but are not limited to, pyridinyl, pyridazinyl, pyrimidyl, pyrazyl, triazinyl, pyrrolyl, pyrazolyl, imidazolyl, (1,2,3,)- and (1,2,4)-triazolyl, pyrazinyl, pyrimidinyl, tetrazolyl, furyl, thienyl, isoxazolyl, thiazolyl, isoxazolyl, and oxazolyl. A heteroaryl group can be unsubstituted or substituted with one, two or more suitable substituents. Preferably, a heteroaryl group is a monocyclic ring, wherein the ring comprises 1 to 5 carbon atoms and 1 to 4 heteroatoms.

The term substituted, in e.g. substituted alkyl group means that the alkyl group may be substituted by other atoms than the atoms normally present in such a group, i.e. carbon and hydrogen. For example, a substituted alkyl group may include a halogen atom or a thiol group. An unsubstituted alkyl group contains only carbon and hydrogen atoms.

Unless otherwise specified a substituted alkyl group, a substituted alkenyl group, a substituted alkynyl group, a substituted aralkyl group, a substituted alkaryl group, a substituted aryl, a substituted heteroaryl and a substituted heterocyclic group are preferably substituted by one or more substituents selected from the group consisting of methyl, ethyl, n-propyl, isopropyl, n-butyl, 1-isobutyl, 2-isobutyl and tertiary-butyl, ester, amide, ether, thioether, ketone, aldehyde, sulfoxide, sulfone, sulfonate ester, sulphonamide, —Cl, —Br, —I, —OH, —SH, —CN and —NO$_2$.

Laser Markable Composition

The laser markable composition comprises at least a first and a second Diffusion Hindered Molecular Assembly (DHMA), the DHMA's comprising a leuco dye and respectively a first and second sensitizer.

A DHMA comprising a leuco dye and a sensitizer inhibits or hinders the diffusion of the leuco dye and the sensitizer in the laser markable composition, or layer formed from the composition.

The diffusion of the leuco dye in the DHMA is limited to such an extent that before exposure substantially no colour formation occurs. The limited diffusion of the leuco dye results in substantially no reaction of the leuco dye with a developer present in the laser markable composition.

The diffusion of the sensitizer in the DHMA is limited to such an extent that upon exposure, the DHMA containing the sensitizer may be selectively addressed by, for example, a laser exposure.

The DHMA is preferably selected from the group consisting of a capsule composed of a polymeric shell surrounding a core which contains a leuco dye and a sensitizer; a polymer particle charged with a leuco dye and a sensitizer; and a composite particle dispersion containing a leuco dye and a sensitizer.

The laser markable composition is preferably an aqueous composition.

In a preferred embodiment, the laser markable composition is an aqueous inkjet ink. The inkjet ink preferably has a viscosity lower than 35 mPa·s, preferably lower than 28 mPa·s, and most preferably between 2 and 25 mPa·s at 25° C. and measured at a shear rate of 90 $5^{-1}$. When using so-called throughflow printheads, the viscosity of the inkjet ink may be higher, preferably below 60 mPa·s at 25° C. and at a shear rate of 90 $s^{-1}$.

Colour Laser Markable Article

The colour laser markable article is prepared by applying the colour laser markable composition on a support thereby forming a laser markable layer onto the support.

The laser markable composition may be provided onto a support by co-extrusion or any conventional coating technique, such as dip coating, knife coating, extrusion coating, spin coating, spray coating, slide hopper coating and curtain coating. Preferably the laser markable layer is coated with a slide hopper coater or a curtain coater.

The laser markable composition may also be provided onto a support by inkjet printing. Using inkjet printing is preferred when only a part or several parts of a support has to be provided with a laser markable layer.

Applying the laser markable composition on a support results in a colour laser markable article comprising a single laser markable layer comprising at least a first and a second Diffusion Hindered Molecular Assembly (DHMA), the DHMA's comprising a leuco dye and respectively a first and second sensitizer.

The dry thickness of the laser markable layer is preferably between 1 and 50 $g/m^2$, more preferably between 2 and 25 $g/m^2$, and most preferably between 3 and 15 $g/m^2$.

Figure 2:
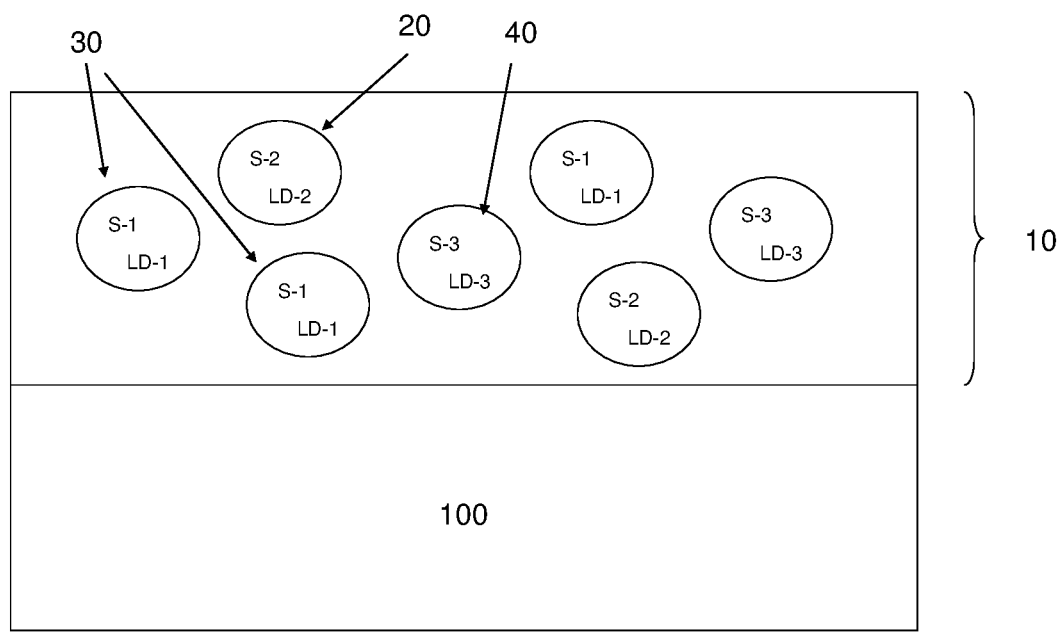

At least two different different colours may be laser marked in the single laser markable layer of the colour laser markable article prepared from the composition: two colours when two DHMA's, both containing a different leuco dye LD-1 and LD-2 and a different sensitizer S-1 and S-2, are present (see FIG. 1); three colours when three DHMA's, all containing a different leuco dye LD-1, LD-2 and LD-3 and a different sensitizer S-1, S-2 and S-3, are present (see FIG. 2).

The single laser markable layer may be combined with other laser markable layers.

Such other laser markable layers may be any known laser markable layer and may be used to produce another colour in addition to the colours formed in the laser markable layer.

Figure 3:
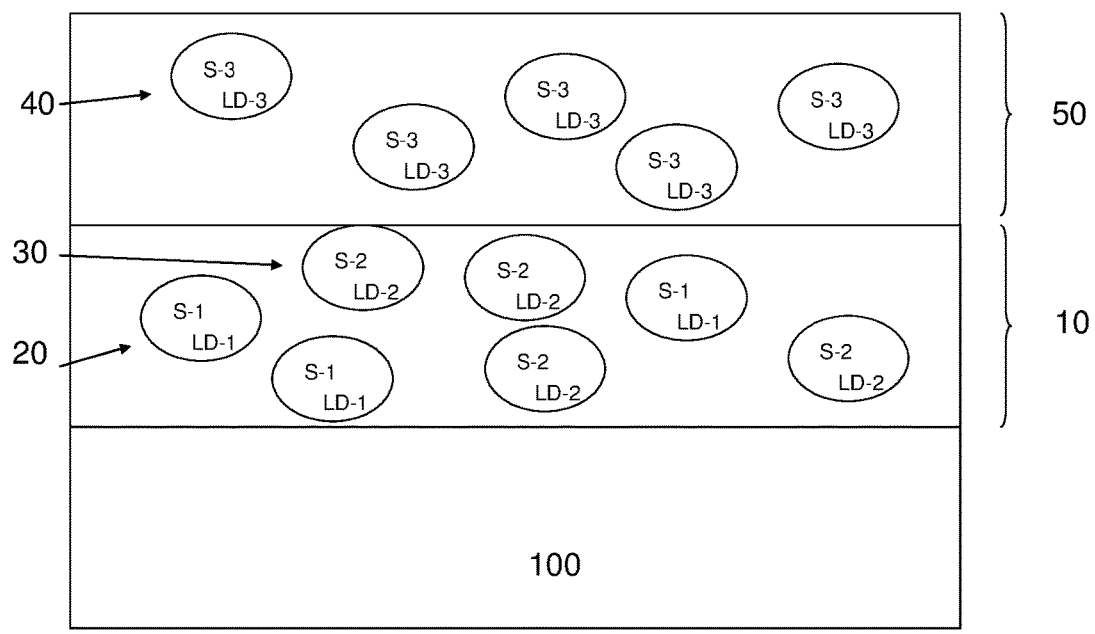

For example, when the laser markable layer is capable of independently forming two colours, for example yellow and magenta, by laser marking using two different laser exposures, it may be combined with another laser markable layer capable of forming independently another colour, for example cyan, by laser marking using a third laser exposure. The other laser markable layer may also contain a DHMA containing a leuco dye and a sensitizer, for example a DHMA containing a leuco dye LD-3 and a sensitizer S-3 (see FIG. 3).

Such other laser markable layer may also be a layer which may undergo carbonization upon exposure to infrared radiation and is therefore capable of forming a black colour. Such laser markable layers are well known in the art and are for example disclosed in EP-A 2567825 paragraph [0111] to [0123].

EP-A 2567825 also discloses a laser markable polymeric support (paragraphs [0109]-[0110]), which may also be used in combination with the laser markable composition.

When an additional laser markable layer is present, it may be advantageous to provide an intermediate layer between such an additional laser markable layer and the laser markable layer to prevent colour contamination.

The DHMA's may contain more than one leuco dye to optimize the colour obtained upon laser marking.

Sensitizer

The sensitizer of a DHMA makes sure that the DHMA is selectively addressed by a laser exposure. Upon exposure the DHMA sensitized for that exposure, becomes disrupted whereupon the leuco dye comes into reactive contact with a so-called developer, which then triggers the colour formation.

The sensitizer is preferably a light-to-heat converter.

In one embodiment of the invention, the first and the second sensitizers have an absorption maximum at different wavelengths so that they can be selectively addressed by different lasers having a wavelength corresponding to the absorption maximum of the sensitizer.

Preferably, the absorption maxima of the first and second sensitizer differ by at least 150 nm, more preferably by at least 200 nm, most preferably by at least 250 nm.

When three DHMA's are present, each containing a different sensitizer, it is preferred that the absorption maxima of all three sensitizers differ by at least 150 nm.

In a particularly preferred embodiment, the first and the second sensitizers having an absorption maximum at different wavelengths are infrared absorbing dyes.

In another embodiment of the invention the first and the second sensitizer are addressed by a laser having a different operation mode. For example when an infrared absorbing pigment is used as first sensitizer and an infrared dye as second sensitizers, the DHMA containing the pigment may be addressed by a laser working in a pulsed mode while the DHMA containing the infrared dye may be addressed by a laser working in a continuous mode.

Infrared Absorbing dyes

Suitable examples of infrared dyes (IR dyes) include, but are not limited to, polymethyl indoliums, metal complex IR dyes, indocyanine green, polymethine dyes, croconium dyes, cyanine dyes, merocyanine dyes, squarylium dyes, chalcogeno-pyryloarylidene dyes, metal thiolate complex dyes, bis(chalcogenopyrylo)-polymethine dyes, oxyindolizine dyes, bis(aminoaryl)polymethine dyes, indolizine dyes, pyrylium dyes, quinoid dyes, quinone dyes, phthalocyanine dyes, naphthalo-cyanine dyes, azo dyes, (metalized) azomethine dyes and combinations thereof.

Preferred infrared absorbing dyes are polymethine dyes due to their low absorption in the visible region and their selectivity, i.e. narrow absorption peak in the infrared region. Particular preferred polymethine infrared dyes are cyanine infrared dyes.

Preferred infrared dyes having an absorption maximum of more than 1100 nm are those disclosed in EP-A 2722367, paragraphs [0044] to [0083] and the unpublished EP-A 14166498.7 (filed on Apr. 30, 2014).

Infrared dyes having an absorption maximum between 1000 nm and 1100 nm are preferably selected from the group consisting of quinoline dyes, indolenine dyes, especially a benzo[cd]indoline dye. A particularly preferred infrared dye is 5-[2,5-bis[2-[1-(1-methylbutyl)-benz[cd]indol-2(1H)-ylidene]ethylidene]-cyclopentylidene]-1-butyl-3-

(2-methoxy-1-methylethyl)-2,4,6(1H,3H,5H)-pyrimidin-etrione (CASRN 223717-84-8) represented by the Formula IR-1:

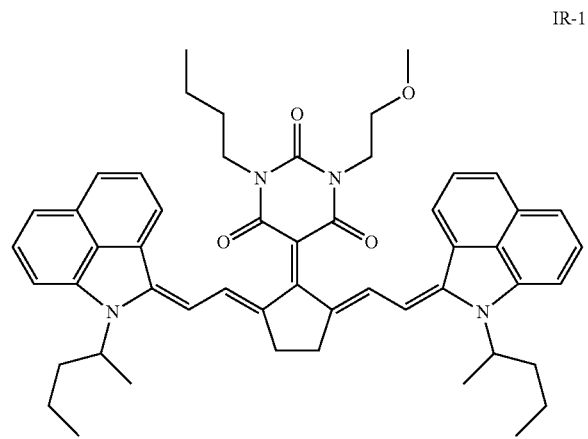 [SMILES: CCCCN1C(=O)/C(=C2C(=C/C=c3\c4cccc5cccc(c54)n3C(C)CCC)\CCC\2=C/C=c2\c3cccc4cccc(c43)n2C(C)CCC)C(=O)N(CCOC)C1=O]

The infrared dye IR-1 has an absorption maximum $\lambda_{max}$ of 1052 nm making it very suitable for a Nd-YAG laser having an emission wavelength of 1064 nm.

Infrared dyes having an absorption maximum between 830 nm and 1000 nm are preferably selected from the group consisting of quinoline dyes, indolenine dyes, especially benzo[e]indolenine dyes, and benzo[f]indolenine dyes.

The amount of the IR dyes is preferably between 0.005 and 1.000 g/m$^2$, more preferably between 0.010 and 0.500 g/m$^2$, most preferably between 0.015 and 0.050 g/m$^2$. Enough IR dye has to be present to ensure sufficient colour density formation upon exposure to IR radiation. However, using too much IR dye may result in unwanted background colouration of the laser markable materials.

Infrared Absorbing Pigments

Suitable examples of infrared absorbing pigments include but are not limited to carbon black such as acetylene black, channel black, furnace black, lamp black, and thermal black; oxides, hydroxides, sulfides, sulfates and phosphates of metals such as copper, bismuth, iron, nickel, tin, zinc, manganese, zirconium, tungsten, lanthanum, and antimony including lanthane hexaboride, indium tin oxide (ITO) and antimony tin oxide, titanium black and black iron oxide.

The infrared dye classes disclosed above may also be used as infrared absorbing pigments, for example cyanine pigment, merocyanine pigment, etc.

A preferred infrared absorbing pigment is carbon black.

The particle size of the pigment is preferably from 0.01 to 5 μm, more preferably from 0.05 to 1 μm.

The amount of the infrared absorbing pigment is between 10 and 1000 ppm, preferably between 25 and 750 ppm, more preferably between 50 and 500 ppm, most preferably between 100 and 250 ppm, all relative to the total dry weight of the laser markable layer. An amount of infrared absorbing pigment above 1000 ppm results in a too high background density of the laser markable article.

Capsules

In a particularly preferred embodiment of the present invention, the Diffusion Hindered Molecular Assembly is a capsule having a polymeric shell surrounding a core containing a leuco dye and a sensitizer.

Upon exposure, a rupture of the capsule, for example by heat produced by the sensitizer upon absorption of IR radiation, results in a reaction between the leuco dye and a developer which then trigger colour formation.

The morphology of capsules and their preparation methods have been reviewed, for example, by Jyothi Sri. S in the International Journal of Pharma and Bio Sciences (Vol.3, Issue 1, January-March 2012).

The capsules typically have an average particle size between 3 and 5 μm, or smaller. Such capsules are often referred to as microcapsules. More preferably, the average particle size of the capsules is from 0.05 to 2 μm, more preferably from 0.10 to 1 μm.

The capsules may have different morphologies, dependent on the preparation method of the capsules. For example mononuclear capsules have a shell around a core while polynuclear capsules have multiple cores enclosed within the shell. Matrix encapsulation refers to a core material which is homogeneously distributed into the shell.

Hydrophilic polymers, surfactants and/or polymeric dispersants may be used to obtain stable dispersions of the capsules in an aqueous medium and to control the particle size and the particle size distribution of the capsules.

In a preferred embodiment, the capsules are dispersed in the aqueous medium using a dispersing group covalently bonded to the polymeric shell. The dispersing group is preferably selected from a group consisting of a carboxylic acid or salt thereof, a sulfonic acid or salt thereof, a phosphoric acid ester or salt thereof, a phosphonic acid or salt thereof, an ammonium group, a sulfonium group, a phosphonium group and a polyethylene oxide group.

The dispersing groups stabilize the aqueous dispersion by electrostatic stabilization. For example, a slightly alkaline aqueous medium will turn the carboxylic acid groups covalently bonded to the polymeric shell into ionic groups, whereafter the negatively charged capsules have no tendency to agglomerate. If sufficient dispersing groups are covalently bonded to the polymeric shell, the capsule becomes a so-called self-dispersing capsule. Other dispersing groups such as sulfonic acid groups tend to be dissociated even in acid aqueous medium and thus do not require the addition of an alkali.

The dispersing group can be used in combination with a polymeric dispersant in order to accomplish steric stabilization. For example, the polymeric shell may have covalently bonded carboxylic acid groups that interact with amine groups of a polymeric dispersant. However, in a more preferred embodiment, no polymeric dispersant is used and dispersion stability is accomplished solely by electrostatic stabilization.

The capsules may also be stabilized by solid particles which adsorb onto the shell. Preferred solid particles are colloidal silica.

There is no real limitation on the type of polymer used for the polymeric shell of the capsule. Preferably, the polymer used in the polymeric shell is crosslinked. By crosslinking, more rigidity is built into the capsules allowing a broader range of temperatures and pressures for handling the colour laser markable article.

Preferred examples of the polymeric shell material include polyureas, polyurethanes, polyesters, polycarbonates, polyamides, melamine based polymers and mixtures thereof, with polyureas and polyurethanes being especially preferred.

Capsules can be prepared using both chemical and physical methods. Suitable encapsulation methodologies include complex coacervation, liposome formation, spray drying and polymerization methods.

In a preferred embodiment the present invention, preferably a polymerization method is used as it allows the highest control in designing the capsules. More preferably interfacial polymerization is used to prepare the capsules used in the invention. This technique is well-known and has recently been reviewed by Zhang Y. and Rochefort D. (Journal of Microencapsulation, 29(7), 636-649 (2012) and by Salitin (in Encapsulation Nanotechnologies, Vikas Mittal (ed.), chapter 5, 137-173 (Scrivener Publishing LLC (2013)).

Interfacial polymerisation is a particularly preferred technology for the preparation of capsules. In interfacial polymerization, such as interfacial polycondensation, two reactants meet at the interface of the emulsion droplets and react rapidly.

In general, interfacial polymerisation requires the dispersion of an oleophilic phase in an aqueous continuous phase or vice versa. Each of the phases contains at least one dissolved monomer (a first shell component) that is capable of reacting with another monomer (a second shell component) dissolved in the other phase. Upon polymerisation, a polymer is formed that is insoluble in both the aqueous and the oleophilic phase. As a result, the formed polymer has a tendency to precipitate at the interface of the oleophilic and aqueous phase, hereby forming a shell around the dispersed phase, which grows upon further polymerisation. The capsules are preferably prepared from an oleophilic dispersion in an aqueous continuous phase.

Typical polymeric shells, formed by interfacial polymerisation are selected from the group consisting of polyamides, typically prepared from di- or oligoamines as first shell component and di- or poly-acid chlorides as second shell component; polyurea, typically prepared from di- or oligoamines as first shell component and di- or oligoisocyanates as second shell component; polyurethanes, typically prepared from di- or oligoalcohols as first shell component and di- or oligoisocyanates as second shell component; polysulfonamides, typically prepared from di- or oligoamines as first shell component and di- or oligosulfochlorides as second shell component; polyesters, typically prepared from di- or oligoalcohols as first shell component and di- or oligo-acid chlorides as second shell component; and polycarbonates, typically prepared from di- or oligoalcohols as first shell component and di- or oligo-chloroformates as second shell component. The shell can be composed of combinations of these polymers.

In a further embodiment, polymers, such as gelatine, chitosan, albumin and polyethylene imine can be used as first shell components in combination with a di- or oligo-isocyanate, a di- or oligo acid chloride, a di- or oligo-chloroformate and an epoxy resin as second shell component.

In a particularly preferred embodiment, the shell is composed of a polyurethane, a polyurea or a combination thereof.

In a further preferred embodiment, a water immiscible solvent is used in the dispersion step, which is removed by solvent stripping before or after the shell formation. In a particularly preferred embodiment, the water immiscible solvent has a boiling point below 100° C. at normal pressure. Esters are particularly preferred as water immiscible solvent. A preferred organic solvent is ethyl acetate, because it also has a low flammability hazard compared to other organic solvents.

A water immiscible solvent is an organic solvent having low miscibility in water. Low miscibility is defined as any water solvent combination forming a two phase system at 20° C. when mixed in a one over one volume ratio.

The method for preparing a dispersion of capsules preferably includes the following steps:

a) preparing a non-aqueous solution of a first reactant for forming a polymeric shell, a leuco dye, a sensitizer, and optionally a water immiscible organic solvent having a lower boiling point than water;
b) preparing an aqueous solution of a second reactant for forming the polymeric shell;
c) dispersing the non-aqueous solution under high shear in the aqueous solution;
d) optionally stripping the water immiscible organic solvent from the mixture of the aqueous solution and the non-aqueous solution; and
e) preparing the polymeric shell around the leuco dye and the sensitizer by interfacial polymerization of the first and second reactants for forming the polymeric shell.

Polymer Particles

In another preferred embodiment of the present invention, the Diffusion Hindered Molecular Assembly is a polymer particle charged with a leuco dye and a sensitizer.

The polymer particles are preferably latex particles, i.e. polymer particles with which a stable aqueous dispersion may be formed. The polymeric particles are preferably nanoparticles. The term polymer "nanoparticles" means that at least part of the polymer particles has a particle diameter less than 1 μm as determined by Laser Diffraction. The polymer nanoparticles preferably have an average diameter smaller than 1 μm.

There is no real limitation on the chemical nature of the polymer particles. Suitable examples of the polymer of the polymer particles include a vinyl polymer and a condensed polymer (e.g. an epoxy resin, polyester, polyurethane, polyamide, cellulose, polyether, polyurea, polyimide, and polycarbonate). Among the above, a vinyl polymer and a polyurethane polymer or copolymer are particularly preferred.

The polymer particles are preferably self-dispersible polymer particles. In preparing a self-dispersing polymer latex, preferably a monomer is used selected from the group consisting of a carboxylic acid monomer, a sulfonic acid monomer, and a phosphoric acid monomer.

Specific examples of the unsaturated carboxylic acid monomer include acrylic acid, methacrylic acid, crotonic acid, itaconic acid, maleic acid, fumaric acid, citraconic acid, and 2-methacryloyloxy methylsuccinic acid. Specific examples of the unsaturated sulfonic acid monomer include styrene sulfonic acid, 2-acrylamido-2-methyl propane sulfonic acid, 3-sulfopropyl (meth)acrylate, and bis-(3-sulfopropyl)-itaconate. Specific examples of the unsaturated phosphoric acid monomer include vinyl phosphoric acid, vinyl phosphate, and bis(methacryloxyethyl)phosphate. Such monomers may be incorporated into polyurethane copolymers which include a (meth)acrylate polymeric chain.

For polyurethane polymer particles, the self-dispersing group may be incorporated via a diol and/or a diamine having any of phosphate group, a sulfonic acid group, a N,N-disubstituted amino group, a carboxyl group, a neutralized phosphate group, a neutralized sulfonic acid group, a neutralized N,N-disubstituted amino group and a neutralized carboxyl group. Specific examples thereof include trimethylolpropane monophosphate, trimethylolpropane monosulfate, a polyester diol where at least a part of the dibasic acid component is sodium sulfosuccinate or sodium sulfoisophthalate, N-methyldiethanolamine, diaminocarboxylic acid such as lysine, cystine or 3,5-diaminocarboxylic acid, 2,6-dihydroxybenzoic acid, 3,5-dihydroxy-benzoic acid, dihydroxyalkylalkanoic acid such as 2,2-bis(hydroxymethyl)propionic acid, 2,2-bis(hydroxyethyl)propionic acid, 2,2-bis(hydroxypropyl)-propionic acid, bis(hydroxymethyl) acetic acid or 2,2-bis(hydroxymethyl)butanoic acid, bis(4-hydroxyphenyl)-acetic acid, 2,2-bis(4-hydroxyphenyl)pentanoic acid, tartaric acid, N,N-hydroxyethylglycine, N,N-bis (2-hydroxyethyl)-3-carboxypropionamide and a carboxyl group-containing polycaprolactone diol where a lactone compound such as ε-caprolactone is added to dihydroxyalkylalkanoic acid.

Manufacturing methods for polyurethane polymer or copolymer particles are well-known. Generally a compound having a salt group, a polyisocyanate compound having two or more isocyanate groups, and a polyol compound are reacted to form a polyurethane polymer. Then the salt group is neutralized at 50° C. or lower using a basic compound. The obtained polyurethane polymer or copolymer is then dispersed in an aqueous medium followed by evaporation of organic solvent.

Examples of the above di- and higher functional polyisocyanate compound include an aliphatic diisocyanate such as 1,6-hexamethylene diisocyanate, 2,2,4-trimethyl-hexamethylene diisocyanate or lysine diisocyanate; an aliphatic polyisocyanate such as a trimer of the above aliphatic diisocyanate or an adduct of low-molecular triol with the above aliphatic isocyanate; an alicyclic diisocyanate such as isophorone diisocyanate, hydrogenated MDI, hydrogenated tolylene diisocyanate, methyl-cyclohexylene diisocyanate, isopropylidenecyclohexyl-4,4'-diisocyanate or norbornene diisocyanate; an alicyclic polyisocyanate such as a trimer of the above alicyclic diisocyanate or an adduct of low-molecular triol with the above alicyclic isocyanate; an aromato-aliphatic diisocyanate such as xylylene diisocyanate; an aromatic alicyclic polyisocyanate such as a trimer of xylylene diisocyanate or an adduct of low-molecular triol with the above aromato-aliphatic isocyanate; an aromatic diisocyanate such as 4,4'-diphenylmethane diisocyanate or tolylene diisocyanate; an aromatic polyisocyanate such as triphenylmethane triisocyanate, a trimer of the above aromatic diisocyanate or an adduct of low-molecular triol with the above aromatic isocyanate; a tri- or higher functional polyisocyanate such as polymethylene polyphenyl isocyanate; and a polyisocyanate compound having a carbodiimide group such as Cosmonate LL (manufactured by Mitsui Chemical; a mixture of carbodiimidated 4,4'-diphenylmethane diisocyanate with 4,4'-diphenyl-methane diisocyanate) or Carbodilide V-05 (manufactured by Nisshinbo; a terminal aliphatic polyisocyanate compound having a polycarbodiimide group). It is also possible that two or more of the above polyisocyanate compounds are mixed and used.

Examples of the above polyol compound include ethylene glycol, propylene glycol, diethylene glycol, cyclohexane-1,4-dimethanol, 1,3-butylene glycol, 1,4-butylene glycol, neopentyl glycol, 1,6-hexanediol, 3-methyl-1,5-pentanediol, 2-ethyl-1,3-hexanediol, 2-butyl-2-ethyl-1,3-propanediol, 2-methyl-1,8-octanediol, 1,9-nonanediol, cyclohexyl dimethanol, bisphenol A, bisphenol F, hydrogenated bisphenol A, hydrogenated bisphenol F, castor oil modified diol and castor oil modified polyol.

For charging a leuco dye and a sensitizer onto polymer nanoparticles, the leuco dye and the sensitizer are first dissolved in a water-immiscible organic solvent having a boiling point of lower than 100° C. This solvent mixture is then finely dispersed in water or an aqueous medium, for example by a homogenizer, a microfluidizer or very high speed stirring in order to form an 'oil-in-water' emulsion. This emulsion is then under stirring added to an aqueous medium containing dispersed polymer particles. The organic solvent is then distilled therefrom so that the leuco dye and the sensitizer are transferred from the organic solvent phase to the polymer particles as they become insoluble in the aqueous phase.

In order to obtain more concentrated charged polymer nanoparticle dispersions, the following method is used. The leuco dye and the sensitizer are first dissolved in a water-immiscible organic solvent having a boiling point of lower than 100° C. This solvent mixture is then added to an aqueous medium containing dispersed polymer nanoparticles under very high speed stirring or by using a homogenizer or a microfluidizer. The organic solvent is distilled there from so that the leuco dye and the sensitizer are transferred from the organic solvent phase to the polymer nanoparticles as it becomes insoluble in the aqueous phase.

Examples of an organic solvent having boiling point of lower than 100° C. include acetone, methyl ethyl ketone, tetrahydrofuran, ethyl ether, n-propyl ether, isopropyl ether, n-butyl methyl ether, tert-butyl methyl ether, n-butyl ethyl ether, tert-butyl ethyl ether, ethyl acetate, isopropyl acetate, methyl propionate and acetonitrile although they are non-limitative. In addition, each of them may be used solely or they may be used jointly by mixing them. Among those ones, ethyl acetate and methyl ethyl ketone are preferred.

Composite Particle Dispersion

In another embodiment of the present invention, the Diffusion Hindered Molecular Assembly is a Composite Particle Dispersion of a leuco dye and a sensitizer. The term "Composite Particle Dispersion" of a leuco dye and a sensitizer as used herein means a dispersion of the leuco dye and the sensitizer in an aqueous medium. The term "Composite Particle Dispersion" refers to the fact that the particles may contain, in addition to the leuco dye and the sensitizer, other ingredients such as surfactants, polymeric resins, polymeric dispersants, or water-immiscible organic solvents.

A preferred embodiment of such a Composite Particle Dispersion of a leuco dye and a sensitizer is prepared by first dissolving the leuco dye and the sensitizer in organic solvent. The organic solvent may be a volatile organic solvent, a non-volatile organic solvent or preferably a mixture of a volatile and non-volatile organic solvent. This solution is then added to an aqueous medium, preferably under very high speed stirring or by using a homogenizer or a microfluidizer. When a volatile organic solvent is present, it is preferably removed from the system, preferably by heating. When a non-volatile organic solvent is used, the result is an oil-in-water emulsion wherein the leuco dye and the sensitizer is present in the oil phase of the emulsion. This oil-in-water emulsion is however also referred to herein as a composite particle dispersion.

The organic solvent is a liquid at room temperature, water immiscible and capable of dissolving the leuco dye and the sensitizer. Low miscibility is defined as any water solvent combination forming a two phase system at 20° C. when mixed in a one over one volume ratio.

Examples of suitable volatile organic solvent are the organic solvents having a boiling point below 100° C. described above for preparing the Capsules and the Polymer particles containing a leuco dye.

Examples of the non-volatile organic solvents are phosphates, phthalates, (meth)acrylates, fatty acid amides, alkylated biphenyls, alkylated terphenyls, alkylated naphthalenes, diarylethanes, chlorinated paraffins, alcohol solvents, phenolic solvents, ether solvents, monoolefin solvents and epoxy solvents. Preferred examples are high boiling solvents such as tricresyl phosphate, trioctyl phosphate, octyldiphenyl phosphate, tricyclohexyl phosphate, dibutylphthalate, dioctyl phthalate, dilauryl phthalate, dicyclohexyl phthalate, diethylene glycol benzoate, dioctyl cebacate, dibutyl cebacate, dioctyl adipate, trioctyl trimellitate, acetyltriethyl citrate, octyl maleate, dibutyl maleate, isoamylbiphenyl, chlorinated paraffin, diisopropylnaphthalene, 1,1'-ditolylethane, monoisopropylbiphenyl, diisopropylbiphenyl, 2,4-ditertiary-amylphenol, N,N-dibutyl-2-butoxy-5-tertiary-octylaniline, 2-ethylhexyl hydroxybenzoate, and polyethylene glycol.

The non-volatile organic solvent described above may be at least partially replaced by a non-crystalline polymer.

The distillation of the organic solvent having a boiling point of lower than 100° C. is preferably carried out under reduced pressure to avoid decomposition of the leuco dye and the sensitizer. Under reduced pressure, the temperature may be lowered, for example to 70° C. or lower, during the distillation step.

Hydrophilic polymers, surfactants and/or polymeric dispersants may be used to obtain stable dispersions of the Composite Particle Dispersion in an aqueous medium and to control the particle size and the particle size distribution of Composite Particles.

Polymeric dispersants typically have anchoring groups, which adsorb on the surface of the composite particles. The polymeric dispersant added to the aqueous medium containing the composite particles preferably includes one more functional groups selected from a carboxylic acid or salt thereof, a sulfonic acid or salt thereof, a phosphoric acid ester or salt thereof, a phosphonic acid or salt thereof, an ammonium group, a sulfonium group, a phosphonium group and a polyethylene oxide group. In a more preferred embodiment, the polymeric dispersant added to the aqueous medium containing the composite particles preferably includes one more functional groups selected from the group consisting of: —COO$^-$M$^+$, —SO$_3$$^-$M$^+$, —O—PO$_3$$^-$M$^+$, —O—SO$_3$$^-$M$^+$, —PC$_3$$^-$M$^+$; wherein M$^+$ represents H$^+$ or a cation selected from the group consisting of Na$^+$, Li$^+$, K$^+$ and NH$_4$$^+$.

When surfactants are used, non-ionic and anionic surfactants are preferred.

Suitable non-ionic surfactants are disclosed in WO2005/111727 page 7, ln.24 to page 8, ln.5).

Suitable anionic surfactants are disclosed in WO2005/111727 page 6, ln.32 to page 7, ln.23).

These surfactants may be used in combination with a polymeric dispersant described above.

To obtain the right colour, for example a specific blue colour, typically more than one leuco dye is used. For each leuco dye, a different Composite Particle Dispersion may be prepared as described above. However, it may be advantageous, especially regarding the stability of the dispersions, to make a single Composite Particle Dispersion containing the different leuco dyes.

Developer

Upon absorption of for example infrared radiation, the infrared dye converts that radiation into heat. The heat than disrupts the Diffusion Hindered Molecular Assemblies whereupon the leuco dye comes into reactive contact with a so-called developer which then triggers the colour formation.

Various electron accepting substances may be used as developers in the present invention. Examples thereof include phenolic compounds, organic or inorganic acidic compounds and esters or salts thereof.

Specific examples include bisphenol A; tetrabromobisphenol A; gallic acid; salicylic acid; 3-isopropyl salicylate; 3-cyclohexyl salicylate; 3-5-di-tert-butyl salicylate; 3,5-di-α-methyl benzyl salicylate; 4,4'-isopropylidenediphenol; 1,1'-isopropylidene bis(2-chlorophenol); 4,4'-isopropylene bis(2,6-dibromo-phenol); 4,4'-isopropylidene bis(2,6-dichlorophenol); 4,4'-isopropylidene bis(2-methyl phenol); 4,4'-isopropylidene bis(2,6-dimethyl phenol); 4,4'-isopropylidene bis(2-tert-butyl phenol); 4,4'-sec-butylidene diphenol; 4,4'-cyclohexylidene bisphenol; 4,4'-cyclohexylidene bis(2-methyl phenol); 4-tert-butyl phenol; 4-phenyl phenol; 4-hydroxy diphenoxide; α-naphthol; βnaphthol; 3,5-xylenol; thymol; methyl-4-hydroxybenzoate; 4-hydroxy-acetophenone; novolak phenol resins; 2,2'-thio bis(4,6-dichloro phenol); catechol; resorcin; hydroquinone; pyrogallol; fluoroglycine; fluoroglycine carboxylate; 4-tert-octyl catechol; 2,2'-methylene bis(4-chlorophenol); 2,2'-methylene bis(4-methyl-6-tert-butyl phenol); 2,2'-dihydroxy diphenyl; ethyl p-hydroxybenzoate; propyl p-hydroxybenzoate; butyl p-hydroxy-benzoate; benzyl p-hydroxybenzoate; p-hydroxybenzoate-p-chlorobenzyl; p-hydroxybenzoate-o-chlorobenzyl; p-hydroxybenzoate-p-methylbenzyl; p-hydroxybenzoate-n-octyl; benzoic acid; zinc salicylate; 1-hydroxy-2-naphthoic acid; 2-hydroxy-6-naphthoic acid; 2-hydroxy-6-zinc naphthoate; 4-hydroxy diphenyl sulphone; 4-hydroxy-4'-chloro diphenyl sulfone; bis(4-hydroxy phenyl)sulphide; 2-hydroxy-p-toluic acid; 3,5-di-tert-zinc butyl salicylate; 3,5-di-tert-tin butyl salicylate; tartaric acid; oxalic acid; maleic acid; citric acid; succinic acid; stearic acid; 4-hydroxyphthalic acid; boric acid; thiourea derivatives; 4-hydroxy thiophenol derivatives; bis(4-hydroxyphenyl) acetate; bis(4-hydroxyphenyl)ethyl acetate; bis(4-hydroxyphenyl) acetate-n-propyl; bis(4-hydroxy-phenyl)acetate-n-butyl; bis (4-hydroxyphenyl)phenyl acetate; bis(4-hydroxyphenyl)-benzyl acetate; bis(4-hydroxyphenyl)phenethyl acetate; bis (3-methyl-4-hydroxy-phenyl)acetate; bis(3-methyl-4-hydroxy-phenyl)methyl acetate; bis(3-methyl-4-hydroxyphenyl)acetate-n-propyl; 1,7-bis(4-hydroxyphenylthio)3,5-dioxaheptane; 1,5-bis(4-hydroxyphenylthio)3-oxaheptane; 4-hydroxy phthalate dimethyl; 4-hydroxy-4'-methoxy diphenyl sulfone; 4-hydroxy-4'-ethoxy diphenyl sulfone; 4-hydroxy-4'-isopropoxy diphenyl sulfone; 4-hydroxy-4'-propoxy diphenyl sulfone; 4-hydroxy-4'-butoxy diphenyl sulfone; 4-hydroxy-4'-isopropoxy diphenyl sulfone; 4-hydroxy-4"-sec-butoxy diphenyl sulfone; 4-hydroxy-4'-tert-butoxy diphenyl sulfone; 4-hydroxy-4'-benzyloxy diphenyl sulfone; 4-hydroxy-4'-phenoxy diphenyl sulfone; 4-hydroxy-4'-(m-methyl benzoxy) diphenyl sulfone; 4-hydroxy-4'-(p-methyl benzoxy)diphenyl sulfone; 4-hydroxy-4'-(o-methyl benzoxy)diphenyl sulfone; 4-hydroxy-4'-(p-chloro benzoxy)diphenyl sulfone and 4-hydroxy-4'-oxyaryl diphenyl sulfone.

A preferred developer is a metal salt of salicylate, for example zinc salicylate. A particularly preferred zinc salicylate is zinc 3,5-bis(a-methylbenzyl) salicylate.

The developer may be present in the continuous phase of the laser markable layer or it may be present in a DHMA different from the DHMA's containing the leuco dye and the sensitizer.

Thermal Acid Generating Compounds

Thermal acid generating compounds are compounds that generate an acid at higher temperatures, for example upon exposure to infrared radiation when an infrared absorbing dye is present which converts the infrared radiation into heat. Such thermal acid generating compounds may also be used in the present invention to catalyze or amplify the colour formation.

Because these compounds become a developer, i.e. an acid, upon exposure to infrared radiation, they may be present in a DHMA together with the leuco dye and the sensitizer. However, they may also be present in the laser markable composition, i.e. outside the DHMA or in a DHMA different from the DHMA's containing the leuco dye and the sensitizer.

Preferred thermal acid generating compounds have a structure according to Formula (I) or Formula (II):

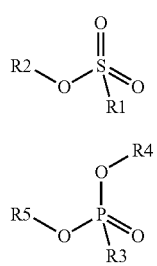

Formula I

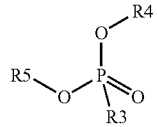

Formula II wherein
R1 and R3 independently represent an optionally substituted alkyl group, an optionally substituted (hetero)cyclic alkyl group, an optionally substituted alkanyl group, an optionally substituted alkenyl group, an optionally substituted alkynyl group, an optionally substituted (hetero)aryl group, an optionally substituted aralkyl group, an optionally substituted alkoxy group, an optionally substituted (hetero)cyclic alkoxy group, or an optionally substituted (hetero)aryl group. R2, R4 and R5 independently represent an optionally substituted alkyl, an optionally substituted aliphatic (hetero) cyclic alkyl group or an optionally substituted aralkyl group; R1 and R2, R4 and R5, R3 and R4, and R3 and R5 may represent the necessary atoms to form a ring.

Suitable alkyl groups include 1 or more carbon atoms such as for example $C_1$ to $C_{22}$-alkyl groups, more preferably $C_1$ to $C_{12}$-alkyl groups and most preferably $C_1$ to $C_6$-alkyl groups. The alkyl group may be lineair or branched such as for example methyl, ethyl, propyl (n-propyl, isopropyl), butyl (n-butyl, isobutyl, t-butyl), pentyl, 1,1-dimethyl-propyl, 2,2-dimethylpropyl and 2-methyl-butyl, or hexyl.

Suitable cyclic alkyl groups include cyclopentyl, cyclohexyl or adamantyl.

Suitable heterocyclic alkyl groups include tetrahydrofuryl, piperidinyl, pyrrolidinyl, dioxyl, tetrahydrothiophenyl, silolanyl, or thianyl oxanyl.

Suitable aryl groups include for example phenyl, naphthyl, benzyl, tolyl, ortho- meta- or para-xylyl, anthracenyl or phenanthrenyl.

Suitable heteroaryl groups include monocyclic- or polycyclic aromatic rings comprising carbon atoms and one or more heteroatoms in the ring structure. Preferably 1 to 4 heteroatoms independently selected from nitrogen, oxygen, selenium and sulphur and/or combinations thereof. Examples include pyridyl, pyrimidyl, pyrazoyl, triazinyl, imidazolyl, (1,2,3,)- and (1,2,4)-triazolyl, tetrazolyl, furyl, thienyl, isoxazolyl, thiazolyl and carbazoyl.

Suitable alkoxy groups include those containing from 1 to 18, preferably 2 to 8 carbon atoms, such as ethoxide, propoxide, isopropoxide, butoxide, isobutoxide and tert-butoxide.

Suitable aryloxy groups include phenoxy and naphthoxy.

The alkyl, (hetero)cyclic alkyl, aralkyl, (hetero)aryl, alkoxy, (hetero)cyclic alkoxy, or (hetero)aryloxy groups may include one or more substituents. The optional substituents are preferably selected from an alkyl group such as a methyl, ethyl, n-propyl, isopropyl, n-butyl, 1-isobutyl, 2-isobutyl and tertiary-butyl group; an ester, amide, ether, thioether, ketone, aldehyde, sulfoxide, sulfone, sulfonate ester or sulphonamide group, a halogen such as fluorine, chlorine, bromine or iodine, —OH, —SH, —CN and —NO$_2$, and/or combinations thereof.

R1 preferably represents a $C_1$ to $C_{22}$-alkyl group, an aliphatic alkoxide group containing 2 to 8 carbons, a phenyl group or a tolyl group. R1 most preferably represents a tolyl group.

R2 preferably represents a $C_1$ to $C_{22}$-alkyl group or a (hetero)cyclic alkyl group. R2 most preferably represents a cyclohexyl group.

R3 preferably represents a $C_1$ to $C_{22}$-alkyl group, an aliphatic alkoxide group containing 2 to 8 carbons or a benzyl group.

In a preferred embodiment, R4 and R5 independently represent a $C_1$ to $C_{22}$-alkyl group. In a preferred embodiment, R4 and R5 represent independently an isobutyl, t-butyl, isopropyl, 2-ethylhexyl or a linear $C_2$ to $C_8$-alkyl group.

The compound can be a monomer, an oligomer (i.e. a structure including a limited amount of monomers such as two, three or four repeating units) or a polymer (i.e. a structure including more than four repeating units).

The compound used contains at least one moiety according to Formula I and/or Formula II, preferably 1 to 150 moieties according to Formula I and/or Formula II. According to a preferred embodiment, the compound according to Formula I or Formula II may be present in a side chain of a polymer.

In the embodiment wherein the compound according to Formula I or Formula II is present in the side chain of a polymer, the following moiety (Formula III, IV or V) is preferably attached to the polymer:

Formula III

Formula IV

Formula V wherein
* denotes the linking to the polymer and
R1, R2, R3 and R4 as described above.

In the embodiment wherein the compound according to Formula I is present in the side chain of a polymer, the polymer is more preferably obtained from the coupling of a polymer or copolymer bearing side chains with alcohol groups and a sulfonyl chloride.

In the embodiment wherein the compound according to Formula I is present in the side chain of a polymer, the polymer is most preferably obtained from the coupling of a polymer or copolymer bearing side chains with alcohol groups and tosyl chloride. Useful polymers bearing side chains with alcohol include for example polyvinyl alcohol, polyvinyl butyral, cellulose derivatives, homo- and copolymers of 2-hydroxyethyl methacrylate, 2-hydroxyethyl acrylate, polysiloxane derivatives such as copolymers of hydroxyalkyl-methylsiloxane, and novolac resins.

Examples of acid generating compounds according to the present invention are shown in Table 1.

TABLE 1

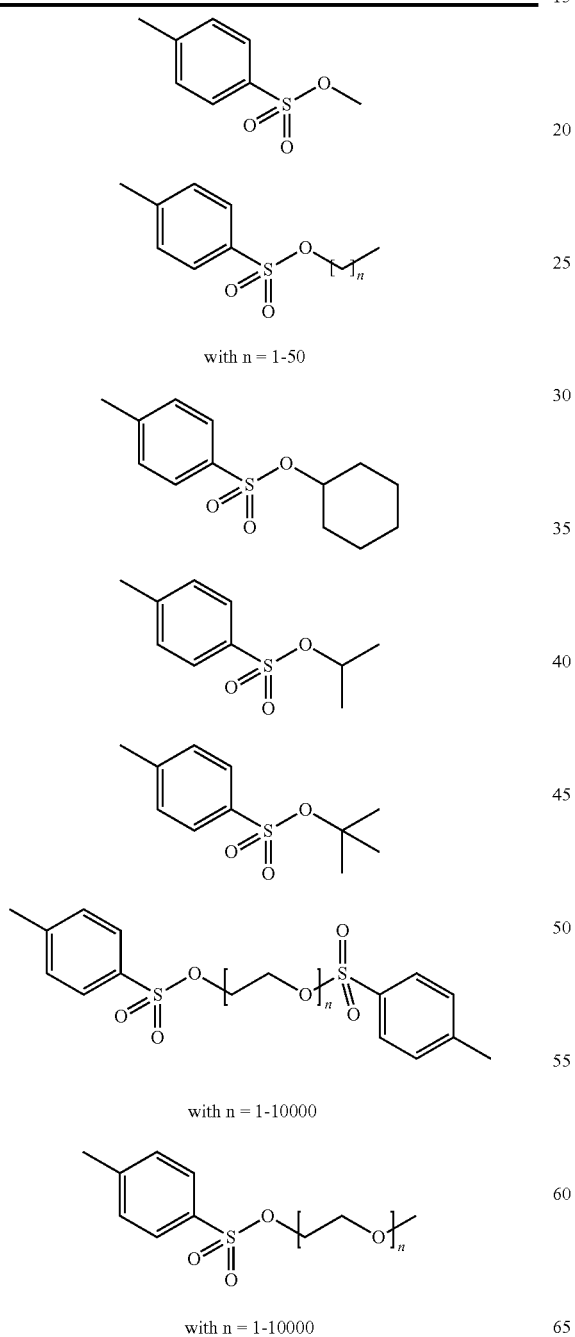

with n = 1-50 with n = 1-10000 with n = 1-10000

TABLE 1-continued

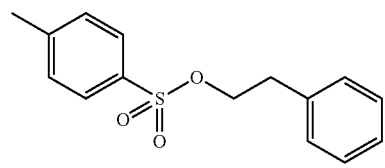 [SMILES: Cc1ccc(S(=O)(=O)OCCc2ccccc2)cc1]

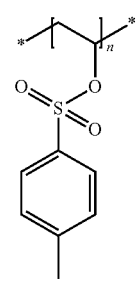

with n = 1-10000 and copolymers

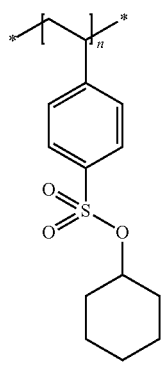

with n = 1-10000 and copolymers

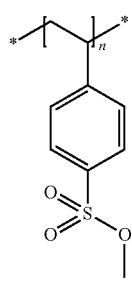

with n = 1-10000 and copolymers

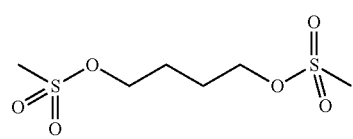

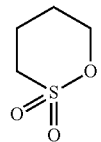

TABLE 1-continued

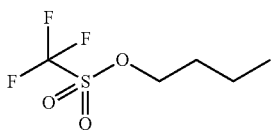
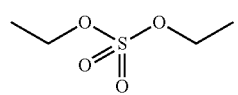
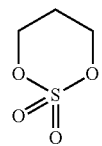
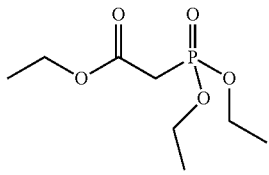
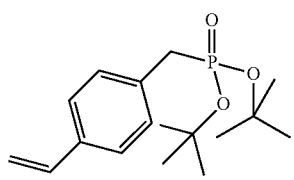 [SMILES: C=Cc1ccc(CP(=O)(OC(C)(C)C)OC(C)(C)C)cc1]
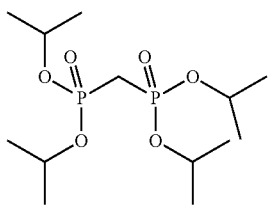 [SMILES: CC(C)OP(=O)(CP(=O)(OC(C)C)OC(C)C)OC(C)C]
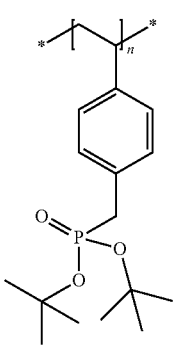

with n = 1-10000 and copolymers

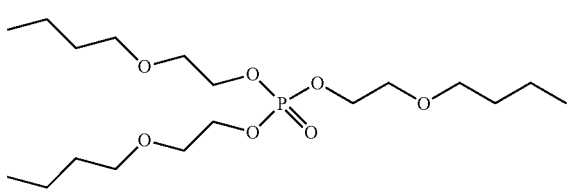 [SMILES: CCCCOCCOP(=O)(OCCOCCCC)OCCOCCCC]

TABLE 1-continued

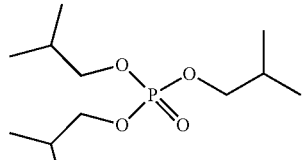
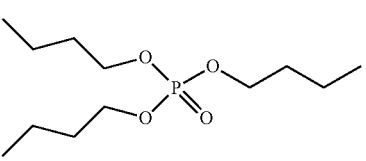 [SMILES: CCCCOP(=O)(OCCCC)OCCCC]
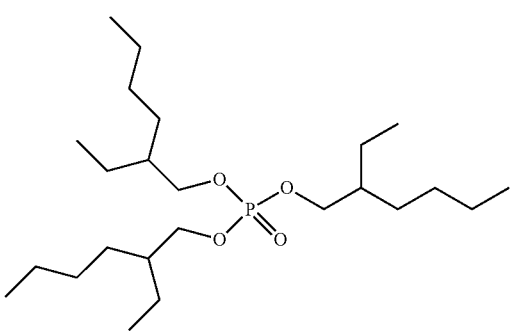 [SMILES: CCCCC(CC)COP(=O)(OCC(CC)CCCC)OCC(CC)CCCC]
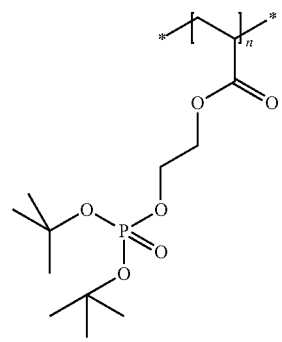

with n = 1-10000 and copolymers

Other classes of photo- and thermal acid generators are iodonium salts, sulfonium salts, ferrocenium salts, sulfonyl oximes, halomethyl triazines, halomethyl-arylsulfone, α-haloacetophenones, sulfonate esters, t-butyl esters, allyl substituted phenols, t-butyl carbonates, sulfate esters, phosphate esters and phosphonate esters.

Leuco Dyes

All publicly-known leuco dyes can be used and are not restricted. They are for example widely used in conventional pressure-sensitive, photosensitive or thermally-sensitive recording materials. For more information about leuco dyes, see for example Chemistry and Applications of Leuco Dyes, Ramaiah Muthyala, Plenum Press, 1997.

A number of classes of leuco dyes may be used as colour forming compounds in the present invention, such as for example: spiropyran leuco dyes such as spirobenzopyrans (e.g. spiroindolinobenzopyrans, spirobenzo-pyranobenzopyrans, 2,2-dialkylchromenes), spironaphtooxazine and spirothiopyran; leuco quinone dyes; azines such as oxazines, diazines, thiazines and phenazine; phthalide- and phthalimidine-type leuco dyes such as triarylmethane phtalides (e.g. crystal violet lactone), diarylmethane phthalides, monoarylmethane phthalides, heterocyclic substituted phthalides, alkenyl substituted phthalides, bridged phthalides (e.g. spirofluorene phthalides and spirobenzanthracene phthalides) and bisphthalides; fluoran leuco dyes such as fluoresceins, rhodamines and rhodols; triarylmethanes such as leuco crystal violet; ketazines; barbituric acid leuco dyes and thiobarbituric acid leuco dyes.

The DHMA's may comprise more then one leuco dye, typically to obtain a specific desired colour.

The leuco dye is preferably present in the laser markable layer in an amount of 0.05 to 5.00 g/m², more preferably in an amount of 0.10 to 3.00 g/m², most preferably in an amount of 0.20 to 1.00 g/m².

The following reaction mechanisms and leuco dyes are suitable to form a coloured dye.

1. Protonation of a Leuco Dye After Fragmentation of an Acid Generator

The reaction mechanism can be represented by:

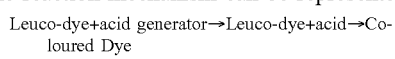
Leuco-dye+acid generator→Leuco-dye+acid→Coloured Dye

All publicly-known photo- and thermal acid generators can be used for the present invention. They can optionally be combined with a photosensitizing dye. Photo- and thermal acid generators are for example widely used in conventional photoresist material. For more information see for example "Encyclopaedia of polymer science", 4th edition, Wiley or "Industrial Photoinitiators, A Technical Guide", CRC Press 2010.

Preferred classes of photo- and thermal acid generators are iodonium salts, sulfonium salts, ferrocenium salts, sulfonyl oximes, halomethyl triazines, halomethylarylsulfone, α-haloacetophenones, sulfonate esters, t-butyl esters, allyl substituted phenols, t-butyl carbonates, sulfate esters, phosphate esters and phosphonate esters.

Preferred leuco dyes are phthalide- and phthalimidine-type leuco dyes such as triarylmethane phtalides, diarylmethane phthalides, monoarylmethane phthalides, heterocyclic substituted phthalides, alkenyl substituted phthalides, bridged phthalides (e.g. spirofluorene phthalides and spirobenzanthracene phthalides) and bisphthalides; and fluoran Leuco Dyes such as fluoresceins, rhodamines and rhodols.

In a more preferred embodiment of the present invention, a combination is used of at least one compound selected from the group consisting of CASRN 50292-95-0, CASRN 89331-94-2, CASRN1552-42-7 (crystal violet lactone), CASRN148716-90-9, CASRN 630-88-6, CASRN 36889-76-7 or CASRN 132467-74-4 as the Leuco Dye and at least one compound selected from the group consisting of CASRN 58109-40-3, CASRN 300374-81-6, CASRN 1224635-68-0, CASRN 949-42-8, CASRN 69432-40-2, CASRN 3584-23-4, CASRN 74227-35-3, CASRN 953-91-3 or CASRN6542-67-2 as acid generator.

2. Oxidation of a Triarylmethane Leuco Dye

The reaction mechanism can be represented by:

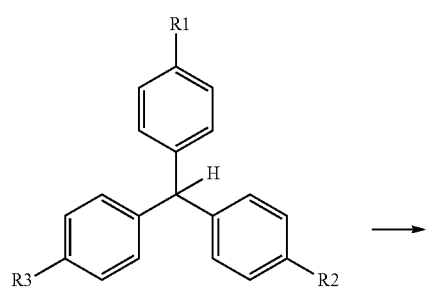

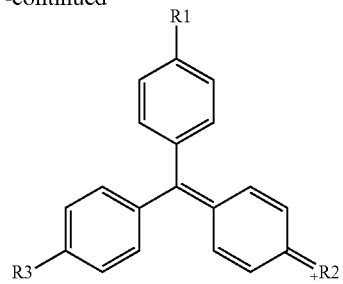

wherein R1, R2 and R3 each independently represent an amino group, an optionally substituted mono- or dialkylamino group, a hydroxyl group or an alkoxy group. R1 and R3 also each independently represent a hydrogen atom or an optionally substituted alkyl, aryl, or heteroaryl group. A preferred leuco dye for the present invention is leuco crystal violet (CASRN 603-48-5).

3. Oxidation of a Leuco Quinone Dye

The reaction mechanism can be represented by

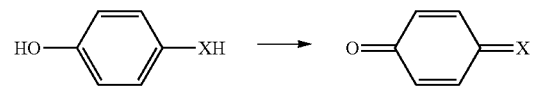

wherein X represents an oxygen atom or an optionally substituted amino or methine group.

4. Fragmentation of a Leuco Dye

The reaction mechanism can be represented by:

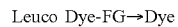
Leuco Dye-FG→Dye wherein FG represents a fragmenting group.

Preferred leuco dyes are oxazines, diazines, thiazines and phenazine. A particularly preferred leuco dye (CASRN104434-37-9) is shown in EP 174054 (POLAROID) which discloses a thermal imaging method for forming colour images by the irreversible unimolecular fragmentation of one or more thermally unstable carbamate moieties of an organic compound to give a visually discernible colour shift from colourless to coloured.

The fragmentation of a leuco dye may be catalyzed or amplified by acids, photo acid generators, and thermal acid generators.

5. Ring Opening of Spiropyran Leuco Dyes

The reaction mechanism can be represented by:

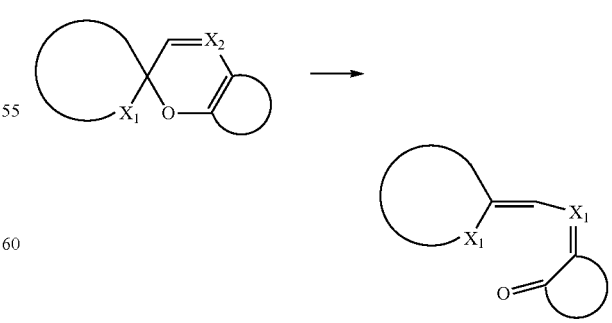

wherein $X_1$ represents an oxygen atom, an amino group, a sulphur atom or a selenium atom and $X_2$ represents an optionally substituted methine group or a nitrogen atom.

The preferred spiropyran leuco dyes for the present invention are spiro-benzopyrans such as spiroindolinobenzopyrans, spirobenzopyranobenzopyrans, 2,2-dialkylchromenes; spironaphtooxazines and spirothiopyrans. In a particularly preferred embodiment, the spiropyran leuco dyes are CASRN 160451-52-5 or CASRN 393803-36-6. The ring opening of a spiropyran leuco dye may be catalyzed or amplified by acids, photo acid generators, and thermal acid generators.

6. Transformation of the Electron Donor/Acceptor Strength of One or More Substituents on the Chromophore of an IR-Leuco Dye IR-leuco Dyes are leuco dyes which have a main absorption in the Infrared. Preferred IR-Leuco Dyes are disclosed in EP-A 1736312 and have a structure according to formula I

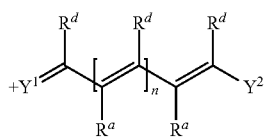

Formula I wherein at least one of the Rd groups is a group which is transformed by a chemical reaction, induced by exposure to IR radiation or heat, into a group which is a stronger electron-donor than said $R^d$; or wherein at least one of the $R^a$ groups is a group which is transformed by a chemical reaction, induced by exposure to IR-radiation or heat, into a group which is a stronger electron acceptor than said $R^a$.

Even more preferred IR-Leuco Dyes are the N-meso substituted cyanine, merocyanine or oxonole dyes wherein the N-meso substituents comprises electron withdrawing groups, disclosed in EP-A 2234964. The most preferred IR-Leuco Dyes are cyanine dyes with —NCH₃—CO—OC(CH₃)₃, —NCH₃—SO₂—CF₃ or —NCH₃—SO₂—C₆H₄—CH₃ meso substituted cyanine dyes. Specific structures of IR-Leuco Dyes are

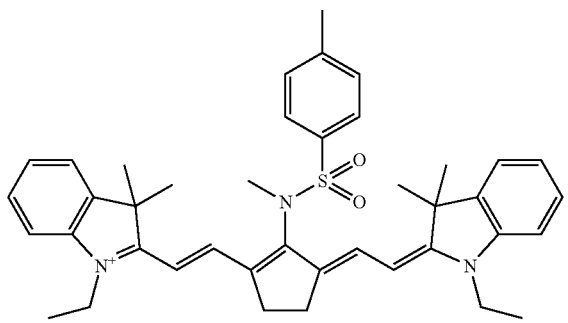

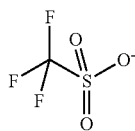

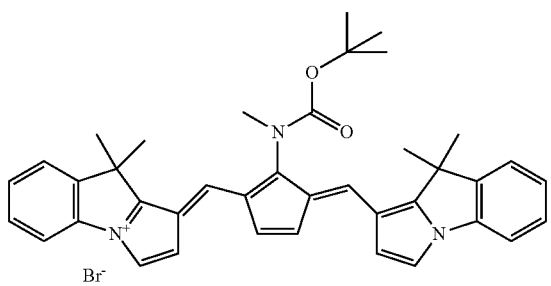

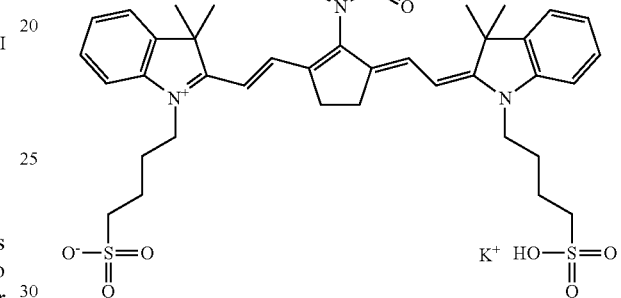

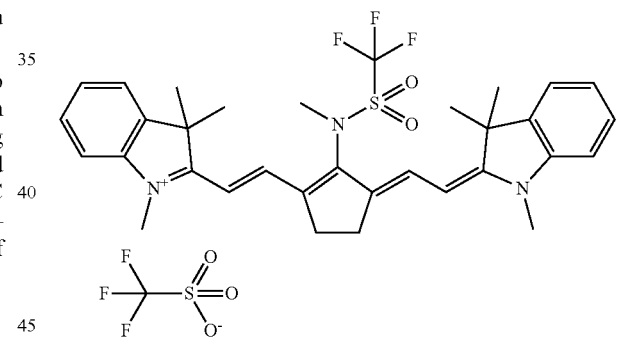

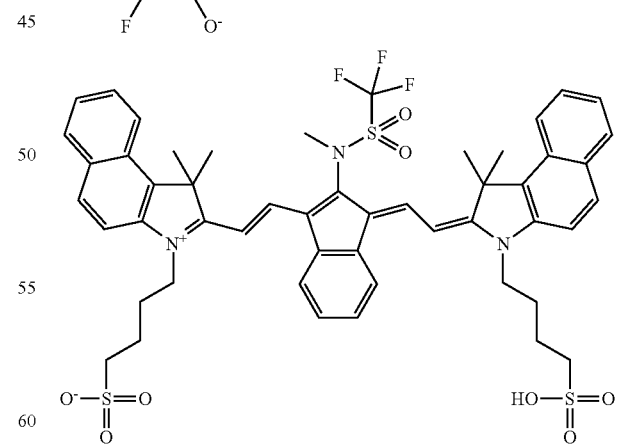

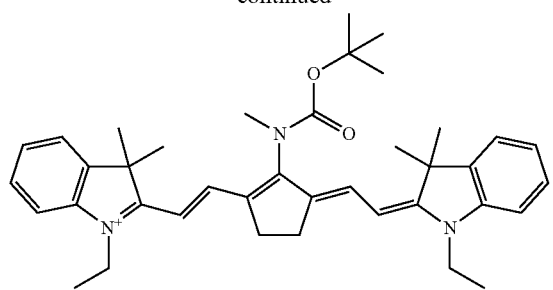

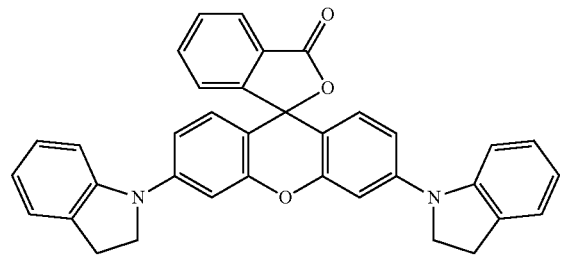
CCFC1

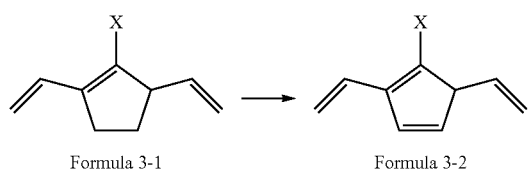

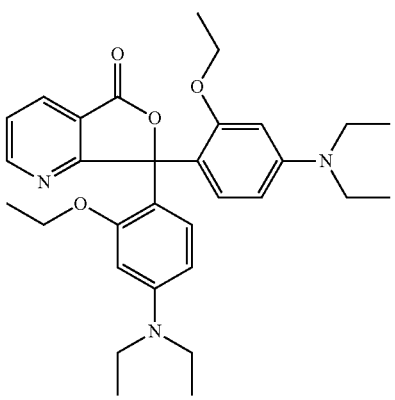
CCFC2

7. Dehydrogenation of an IR-Leuco Dye Comprising a Cyclopentene Group in the Polymethine Chain The reaction mechanism, as described in US20070212643, can be represented by the transformation of an IR cyanine dye with partial structure represented by formula (3-1) into a coloured compound with a partial structure represented by formula (3-2):

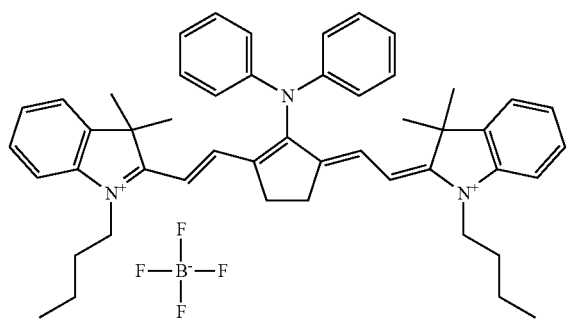 [SMILES: CCCC[N+]1=C(/C=C/C2=C(N(c3ccccc3)c3ccccc3)C(=C/C=C3/[NH+](CCCC)c4ccccc4C3(C)C)/CC2)C(C)(C)c2ccccc21 ; F[B-](F)(F)F]

Formula 3-1        Formula 3-2 wherein X represents a hydrogen atom, a halogen atom, a hydroxyl group, an amino group, a nitro group, a mercapto group, a sulfonic acid group a phosphoric acid group or a monovalent organic group. X preferably represents a diphenylamino group. A particularly preferred IR-Leuco Dye for the present invention has the following structure:

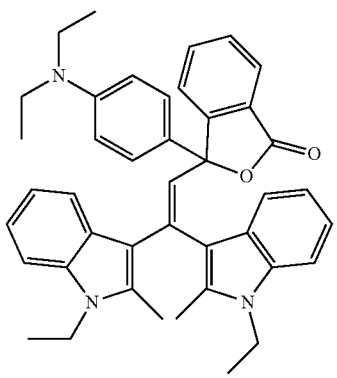 [SMILES: CCN(CC)c1ccc(C2(C=C(c3c(C)n(CC)c4ccccc34)c3c(C)n(CC)c4ccccc34)OC(=O)c3ccccc32)cc1]
CCFC3

In a preferred embodiment of a laser markable layer for producing a magenta colour, the magenta colour forming compound has a structure according to Formula MCFC2:

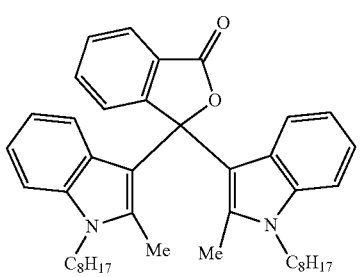
MCFC2

In a preferred embodiment of a laser markable layer for producing a cyan colour, the cyan colour forming compound has a structure according to Formulae CCFC1, CCFC2 or CCFC3.

In a preferred embodiment of a laser markable layer for producing a red colour, the red colour forming compound has a structure according to Formula RCFC:

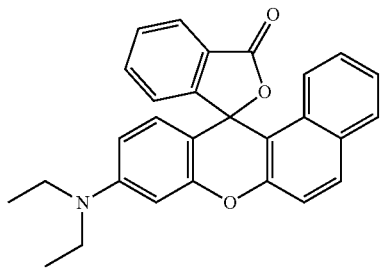

RCFC

In a preferred embodiment of a laser markable layer for producing a yellow colour, the yellow colour forming compound has a structure according to Formula YCFC:

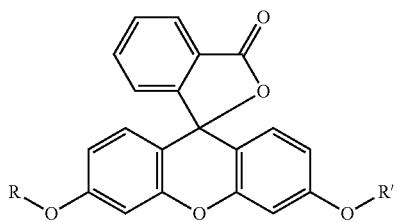

YCFC wherein R, R' are independently selected from a group consisting of a linear alkyl group, a branched alkyl group, an aryl and aralkyl group.

In one embodiment, the yellow colour forming compound has a structure according to Formula YCFC, wherein R and R' independently represent a linear alkyl group, a branched alkyl group, an aryl or an aralkyl group substituted by at least one functional group containing an oxygen atom, a sulphur atom or a nitrogen atom.

A particularly preferred yellow colour forming compound is the compound according to Formula YCFC wherein both R and R' are methyl.

In a most preferred embodiment of a laser markable layer for producing a yellow colour, the yellow colour forming compound has a structure according to Formulae YCFC1 or YCFC2

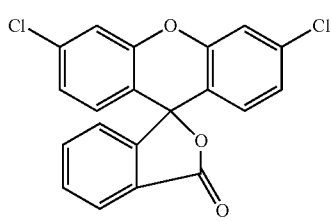

YCFC1

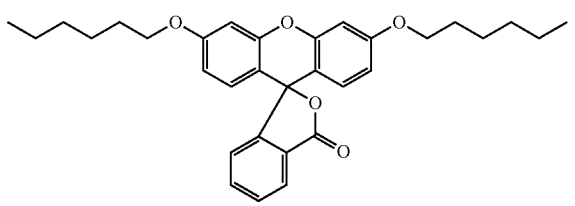

YCFC2

In a preferred embodiment of a laser markable layer for producing a black colour, the black colour forming compound has a structure according to Formula BCFC

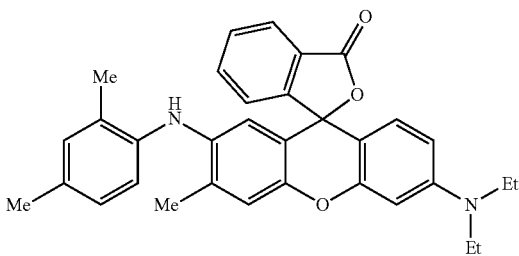

BCFC wherein Me=methyl and Et=Ethyl.

Polymeric Binder

The laser markable composition may include a polymeric binder. In principle any suitable polymeric binder that does not prevent the colour formation in a laser markable layer(s) may be used. The polymeric binder may be a polymer, a copolymer or a combination thereof.

The laser markable layer preferably includes a water soluble or dispersible binder.

Examples of water soluble or dispersible binder are homopolymers and copolymers of vinyl alcohol, (meth)acrylamide, methylol (meth)acrylamide, (meth)acrylic acid, hydroxyethyl (meth) acrylate, maleic anhydride/vinylmethylether copolymers, copolymers of (meth)acrylic acid or vinylalcohol with styrene sulphonic acid, vinyl alcohol/vinylacetate copolymers, carboxy-modified polyvinyl alcohol, carboxymethyl cellulose, hydroxyethyl cellulose, cellulose sulfate, polyethylene oxides, gelatin, cationic starch, casein, sodium polyacrylate, styrene-maleic anhydride copolymer sodium salt, sodium polystyrene sulfonate.

Preferred vinyl alcohol-vinyl acetate copolymers are disclosed in EP-A 2103736, paragraph [79]-[82].

Other preferred water soluble or dispersible binders are the copolymers comprising alkylene and vinyl alcohol units disclosed in EP-A 2457737 paragraph [0013] to [0023] such as the Exceval™ type polymers from Kuraray.

The polymeric binder is preferably present in the colour forming layer in an amount of 1 to 30 $g/m^2$, more preferably in an amount of 2 to 20 $g/m^2$, most preferably in an amount of 3 to 10 $g/m^2$.

Acid Scavenger

The laser markable layer or another layer of the laser markable article may contain one or more acid scavengers.

Acid scavengers include organic or inorganic bases. Examples of the inorganic bases include hydroxides of alkali metals or alkaline earth metals; secondary or tertiary phosphates, borates, carbonates; quinolinates and metaborates of alkali metals or alkaline earth metals; a combination of zinc hydroxide or zinc oxide and a chelating agent (e.g., sodium picolinate); hydrotalcite such as Hycite 713 from Clariant; ammonium hydroxide; hydroxides of quaternary alkylammoniums; and hydroxides of other metals. Examples of the organic bases include aliphatic amines (e.g., trialkylamines, hydroxylamines and aliphatic polyamines); aromatic amines (e.g., N-alkyl-substituted aromatic amines, N-hydroxylalkyl-substituted aromatic amines and bis[p-(dialkylamino)phenyl]-methanes), heterocyclic amines, amidines, cyclic amidines, guanidines and cyclic guanidines.

Other preferred acid scavengers are HALS compounds. Examples of suitable HALS include Tinuvin™ 292, Tinuvin™ 123, Tinuvin™ 1198, Tinuvin™ 1198 L, Tinuvin™ 144, Tinuvin™ 152, Tinuvin™ 292, Tinuvin™ 292 HP, Tinuvin™ 5100, Tinuvin™ 622 SF, Tinuvin™ 770 DF, Chimassorb™ 2020 FDL, Chimassorb™ 944 LD from BASF; Hostavin 3051, Hostavin 3050, Hostavin N 30, Hostavin N321, Hostavin N 845 PP, Hostavin PR 31 from Clariant.

Further examples of acid scavengers are salts of weak organic acids such as carboxylates (e.g. calcium stearate).

A preferred acid scavenger is an organic base, more preferably an amine.

A particular preferred acid scavenger is an organic base having a pKb of less than 7.

UV Absorbers

The laser markable article may also comprise an UV-absorber. The UV-absorber may be present in a laser markable layer or may also be present in another layer, for example an outer layer or an intermediate layer.

Examples of suitable UV-absorbers include 2-hydroxyphenyl-benzophenones (BP) such as Chimassorb™ 81 and Chimassorb™ 90 from BASF; 2-(2-hydroxyphenyl)-benzotriazoles (BTZ) such as Tinuvin™ 109, Tinuvin™ 1130, Tinuvin™ 171, Tinuvin™ 326, Tinuvin™ 328, Tinuvin™ 384-2, Tinuvin™ 99-2, Tinuvin™ 900, Tinuvin™ 928, Tinuvin™ Carboprotect™, Tinuvin™ 360, Tinuvin™ 1130, Tinuvin™ 327, Tinuvin™ 350, Tinuvin™ 234 from BASF, Mixxim™ BB/100 from FAIRMOUNT, Chiguard 5530 from Chitec; 2-hydroxy-phenyl-s-triazines (HPT) such as Tinuvin™ 460, Tinuvin™ 400, Tinuvin™ 405, Tinuvin™ 477, Tinuvin™ 479, Tinuvin™ 1577 ED, Tinuvin™ 1600 from BASF, 2-(2,4-dihydroxyphenyl)-4,6-bis-(2,4-dimethylphenyl)-s-triazine (CASRN1668-53-7) from Capot Chemical Ltd and 4-[4,6-bis(2-methyl-phenoxy)-1,3,5-triazin-2-yl]-1,3-benzenediol (CASRN13413-61-1); titanium dioxide such as Solasorb 100F from Croda Chemicals; zink oxide such as Solasorb 200F from Croda Chemicals; benzoxazines such as Cyasorb UV-3638 F, CYASORB™ UV-1164 from CYTEC; and oxamides such as Sanduvor VSU from Clariant.

Preferred UV absorbers have in the wavelength region between 300 and 400 nm a maximum absorption above 330 nm, more preferably above 350 nm.

Particular preferred UV absorbers are hydroxyphenyl benzotriazoles and 2-hydroxyphenyl-s-triazines having a maximum absorption above 350 nm in the wavelength region 300-400 nm.

Support

The colour laser markable composition is applied on a support to prepare a colour laser markable article. The composition may be applied on any surface, for example a metallic support, a glass support, a paper support.

A preferred support is a polymeric support, more preferably a transparent polymeric support, most preferably a transparent axially stretched polyester support.

Suitable transparent polymeric supports include cellulose acetate propionate or cellulose acetate butyrate, polyesters such as polyethylene terephthalate and polyethylene naphthalate, polyamides, polycarbonates, polyimides, polyolefins, polyvinylchlorides, polyvinylacetals, polyethers and polysulphonamides.

In the most preferred embodiment, the transparent polymeric support is a biaxially stretched polyethylene terephthalate foil (PET-C foil) to be very durable and resistant to scratches and chemical substances.

The support preferably is a single component extrudate, but may also be a co-extrudate. Examples of suitable co-extrudates are PET/PETG and PET/PC.

Polyester supports and especially polyethylene terephthalate supports are preferred because of their excellent properties of dimensional stability. When polyester is used as the support material, a subbing layer is preferably employed to improve the bonding of layers, foils and/or laminates to the support.

The manufacturing of PET-C foils and supports is well-known in the art of preparing suitable supports for silver halide photographic films. For example, GB 811066 (ICI) teaches a process to produce biaxially oriented polyethylene terephthalate foils and supports.

The polyethylene terephthalate is preferably biaxially stretched with a stretching factor of at least 2.0, more preferably at least 3.0 and most preferably a stretching factor of about 3.5. The temperature used during stretching is preferably about 160° C.

Methods to obtain opaque polyethylene terephthalate and biaxially oriented films thereof of have been disclosed in, e.g. US2008/238086.

Subbing Layers

The polymeric support may be provided with one or more subbing layers to improve the adhesion between the laser markable layer and the support.

Useful subbing layers for this purpose are well known in the photographic art and include, for example, polymers of vinylidene chloride such as vinylidene chloride/acrylonitrile/acrylic acid terpolymers or vinylidene chloride/methyl acrylate/itaconic acid terpolymers.

Suitable vinylidene chloride copolymers include: the copolymer of vinylidene chloride, N-tert.-butylacrylamide, n-butyl acrylate, and N-vinyl pyrrolidone (e.g.70:23:3:4), the copolymer of vinylidene chloride, N-tert.-butylacrylamide, n-butyl acrylate, and itaconic acid (e.g. 70:21:5:2), the copolymer of vinylidene chloride, N-tert.-butylacrylamide, and itaconic acid (e.g. 88:10:2), the copolymer of vinylidene chloride, n-butylmaleimide, and itaconic acid (e.g. 90:8:2), the copolymer of vinyl chloride, vinylidene chloride, and methacrylic acid (e.g. 65:30:5), the copolymer of vinylidene chloride, vinyl chloride, and itaconic acid (e.g. 70:26:4), the copolymer of vinyl chloride, n-butyl acrylate, and itaconic acid (e.g. 66:30:4), the copolymer of vinylidene chloride, n-butyl acrylate, and itaconic acid (e.g. 80:18:2), the copolymer of vinylidene chloride, methyl acrylate, and itaconic acid (e.g.90:8:2), the copolymer of vinyl chloride, vinylidene chloride, N-tert.-butylacrylamide, and itaconic acid (e.g. 50:30:18:2). All the ratios given between brackets in the above-mentioned copolymers are ratios by weight.

In a preferred embodiment, the transparent oriented polyester support is provided with a subbing layer including a binder based on a polyester-urethane copolymer.

In a more preferred embodiment, the polyester-urethane copolymer is an ionomer type polyester urethane, preferably using polyester segments based on terephthalic acid and ethylene glycol and hexamethylene diisocyanate.

A suitable polyester-urethane copolymer is Hydran™ APX101 H from DIC Europe GmbH.

The application of subbing layers is well-known in the art of manufacturing polyester supports for silver halide photographic films. For example, the preparation of such subbing layers is disclosed in U.S. Pat. No. 3,649,336 (AGFA) and GB 1441591 (AG FA);

In a preferred embodiment, the subbing layer has a dry thickness of no more than 0.2 µm or preferably no more than 200 mg/m².

Additional Layers

The laser markable article may in addition to the laser markable layer contain additional layers, such as for example other laser markable layers, subbing layers, an outer layer that is suitable as a receiver layer for dyes applied by thermal dye sublimation or even inkjet printing, or intermediate layers between laser markable layers. An outer layer as used herein means an outermost layer, or foil.

The laser markable material preferably comprises an intermediate layer between the laser markable layers to prevent colour contamination. Such an intermediate layer may be a polymeric film such as disclosed in EP-A 2719541 but is preferably a coated layer, preferably a layer coated from an aqueous coating solution.

These intermediate layers preferably contain an acid scavenger as disclosed above to prevent diffusion of an acid from one laser markable layer to another.

Intermediate layers, or more preferably an outer layer, may contain an UV absorber as disclosed above to improve the daylight stability of the laser markable materials.

Core Supports

A colour laser markable document precursor or document may be prepared by applying, preferably laminating, a colour laser markable article on a core support. The core support may be transparent or opaque. The core support is preferably an opaque white core support. The advantage of an opaque white core support is that any information present on the document is more easily readable and that a colour image is more appealing by having a white background.

Preferred opaque white core supports include resin coated paper supports, such as polyethylene coated paper and polypropylene coated paper, and synthetic paper supports such as Synaps™ synthetic paper of Agfa-Gevaert NV.

Other examples of useful high-quality polymeric supports for the present invention include opaque white polyesters and extrusion blends of polyethylene terephthalate and polypropylene. Also Teslin™ may be used as support.

Instead of a white support, a white opacifying layer can be coated onto a transparent polymeric support, such as those disclosed above. The opacifying layer preferably contains a white pigment with a refractive index greater than 1.60, preferably greater than 2.00, and most preferably greater than 2.60. The white pigments may be employed singly or in combination. Suitable white pigments include C.I. Pigment White 1, 3, 4, 5, 6, 7, 10, 11, 12, 14, 17, 18, 19, 21, 24, 25, 27, 28 and 32. Preferably titanium dioxide is used as pigment with a refractive index greater than 1.60. Titanium oxide occurs in the crystalline forms of anatase type, rutile type and brookite type. In the present invention the rutile type is preferred because it has a very high refractive index, exhibiting a high covering power.

In a particular preferred colour laser markable document precursor or document, the laser markable article is applied on both sides of a core support.

Laser Marking Methods

A method of preparing a colour laser marked article comprises the steps of:
- providing a colour laser markable article as described above, and
- colour laser marking the article using at least a first and a second laser wherein the first and the second laser emit at different wavelengths or have a different operation mode.

In one embodiment of the method of colour laser marking an article according to the present invention, the first and the second laser emit at a different wavelength. The wavelength of the lasers preferably corresponds to the maximum absorption of the sensitizers used in the different DHMA's. Most importantly however, the first laser exposure is sufficiently absorbed by the sensitizer of the first DHMA to initiate the first colour formation, while that first laser exposure is substantially not absorbed by the sensitizer of the second DHMA resulting in substantially no second colour formation. The opposite applies for the second laser exposure.

In another embodiment of the method of colour laser marking an article according to the present invention, the first and the second laser have a different laser operation mode, for example the first laser operation mode is a continuous wave mode and the second laser operation mode is a pulsed mode, or both laser operation modes are a pulsed mode but with different pulse repetition rates. The first and the second lasers are preferably infrared lasers. Particular preferred, the first and the second laser is the same infrared laser working in different operation modes.

A preferred continuous wave laser is a semiconductor laser because the device is compact and inexpensive. Most semiconductor lasers are laser diodes, which are pumped with an electrical current in a region where n-doped and p-doped semiconductor material meet. However, there are also optically pumped semiconductor lasers, where carriers are generated by absorbed pump light. Optically pumped semiconductor lasers have the advantage of unique wavelength flexibility, different from any other solid-state based laser. The fundamental near-IR output wavelength is determined by the structure of the gain chip (e.g. the semiconductor InGaAs), and can be set anywhere between about 920 nm and about 1150 nm. This allows a perfect match between the laser emission wavelength and the infrared dye absorption maximum.

A preferred pulsed laser is a solid state Q-switched laser. Q-switching is a technique by which a laser can be made to produce a pulsed output beam. The technique allows the production of light pulses with extremely high peak power, much higher than would be produced by the same laser if it were operating in a continuous wave (constant output) mode, Q-switching leads to much lower pulse repetition rates, much higher pulse energies, and much longer pulse durations.

Other Security Features

The laser markable article is preferably combined with one or more other security features to increase the difficulty for falsifying the document.

To prevent forgeries of identification documents, different means of securing are used. One solution consists in superimposing lines or guilloches on an identification picture such as a photograph. In that way, if any material is printed subsequently, the guilloches appear in white on added black background. Other solutions consist in adding security elements such as information printed with ink that reacts to ultraviolet radiation, micro-letters concealed in an image or text etc.

Suitable other security features such as anti-copy patterns, guilloches, endless text, miniprint, microprint, nanoprint, rainbow colouring, 1D-barcode, 2D-barcode, coloured fibres, fluorescent fibres and planchettes, fluorescent pigments, OVD and DOVID (such as holograms, 2D and 3D holograms, kinegrams™, overprint, relief embossing, perforations, metallic pigments, magnetic material, Metamora colours, microchips, RFID chips, images made with OVI (Optically Variable Ink) such as iridescent and photochromic ink, images made with thermochromic ink, phosphorescent pigments and dyes, watermarks including duotone and multitone watermarks, ghost images and security threads.

EXAMPLES

Materials

All materials used in the following examples were readily available from standard sources such as ALDRICH CHEMICAL Co. (Belgium) and ACROS (Belgium) unless otherwise specified. The water used was deionized water.

Takenate D120N is a urethane resin commercially available from Mitsui.

Mowiol 4 88 is a polyvinyl alcohol commercially available from Hoechst.

Olfine E1010 is a wetting agent commercially available from Shin-Etsu Chemical Company.

Arlo is a 15 wt % aqueous solution of Marlon A365, commercially available from Brenntag.

Proxel Ultra 5 is a biocide commercially available from Avecia.

Ralox 46 is a sterically hindered phenolix antioxidant from Raschig.

Tinuvin 928 is an UV absorber commercially available from BASF.

DISFLAMOLL TKP is a low volatility halogen free phosphate plasticer from Lanxess.

Proxelk is an 5 wt % aqueous solution of 1,2-benzisothiazoline-3-one potassium salt (CASRN 127553-58-6, commercially available from Prom Chem).

MOW is an aqueous solution of bearing 15 wt % Mowiol 4 88 and 2 wt % Proxelk.

CCE is Bayhydrol H 2558, an anionic polyester urethane (37.3%) from BAYER.

Resorcinol is commercially available from Sumitomo Chemicals.

Par is a dimethyltrimethylolamine formaldehyde resin from Cytec industries.

PAR-sol is a 40 wt % aqueous solution of Par.

PEA is Tospearl™ 120 from Momentive Performance materials.

PEA-sol is a 10 wt % (50/50) aqueous/ethanol dispersion of PEA.

Dowfax™ 2A1 from Pilot Chemicals C is a Alkyldiphenyloxide disulfonate (4.5% wt).

MEK is an abbreviation used for methylethylketone.

DOW-sol is a 2.5 wt % solution of Dowfax™ 2A1 in isopropanol.

Surfynol™ 420 from Air Products is a non ionic surfactant.

Surfynsol is a 2.5 wt % solution of Surfynol™ 420 in isopropanol.

CORE is a 500 μm opaque PETG core available as PET-G 500 type 9311 from WOLFEN.

YLD is a leuco dye prepared as follows:

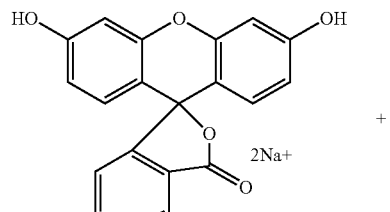

FluoresceinYLD

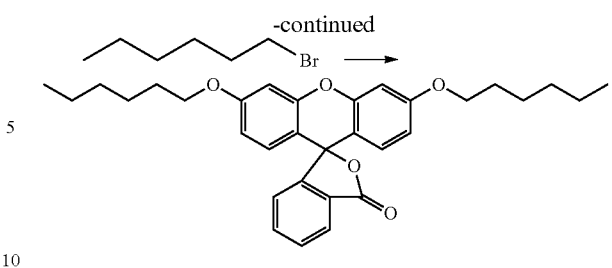

55 g fluorescein, disodium salt (Acros Chemicals) and 55 g potassium hydroxide were dissolved in 110 ml water. 150 g 1-bromohexane (Sigma-Aldrich) and 3 g tetrabutylammonium bromide (Merck) were added to the solution. The reaction mixture was stirred under reflux during 24 h. 200 g toluene and 80 g water were added to the reaction mixture which was further stirred under reflux for 30 minutes. The organic phase was dried with sodium sulphate and evaporated under reduced pressure. The desired product was recrystallised from isopropanol. The compound was analyzed using TLC-chromatography (TLC Silica gel 60 Partisil KC18F; supplied by Whatman, eluent: methanol, Rf: 0.4).

BLD1 is a leuco dye with the following formula commercially available from Mitsui.

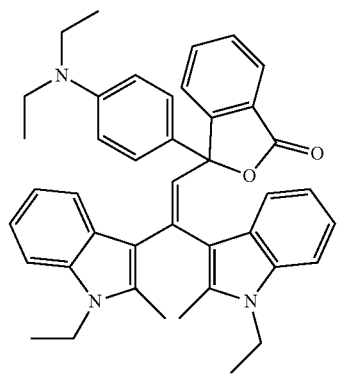

BLD2 is a leuco dye with the following formula commercially available from Mitsui.

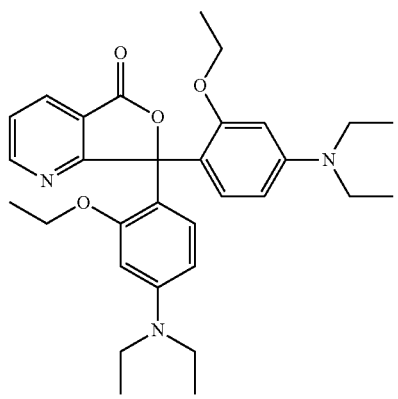 [SMILES: CCOc1cc(N(CC)CC)ccc1C1(c2ccc(N(CC)CC)cc2OCC)OC(=O)c2cccnc21]

BLD3 is a leuco dye with the following formula commercially available from Yamada Chemical Co.

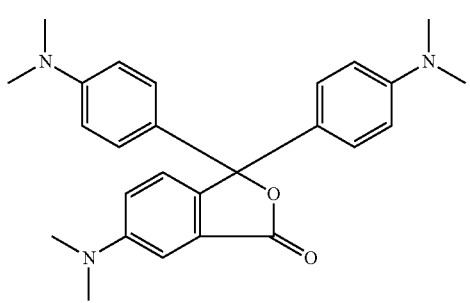
MLD1 is a leuco dye with the following formula commercially available from Mitsui.
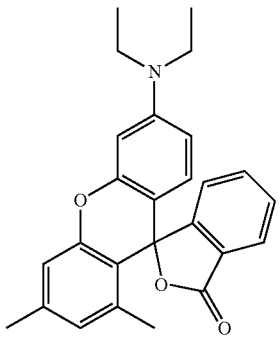
MLD3 is a leuco dye with the following formula commercially available from Tokyo Kasei Kogyo
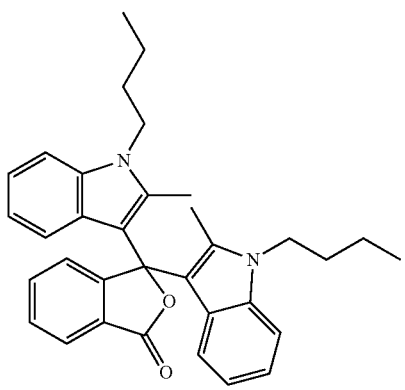 [SMILES: CCCCn1c(C)c(C2(c3c(C)n(CCCC)c4ccccc34)OC(=O)c3ccccc32)c2ccccc21]
MLD2 is a leuco dye with the following formula commercially available from Connect Chemical.
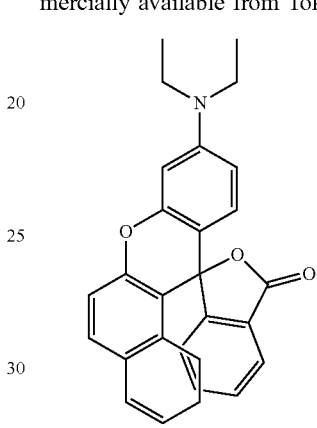
1150IR is an IR dye prepared as follows:
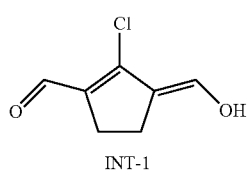
INT-1
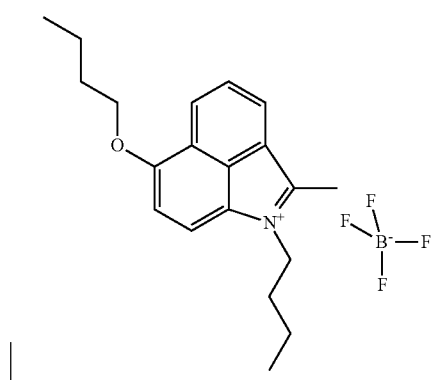
INT-7
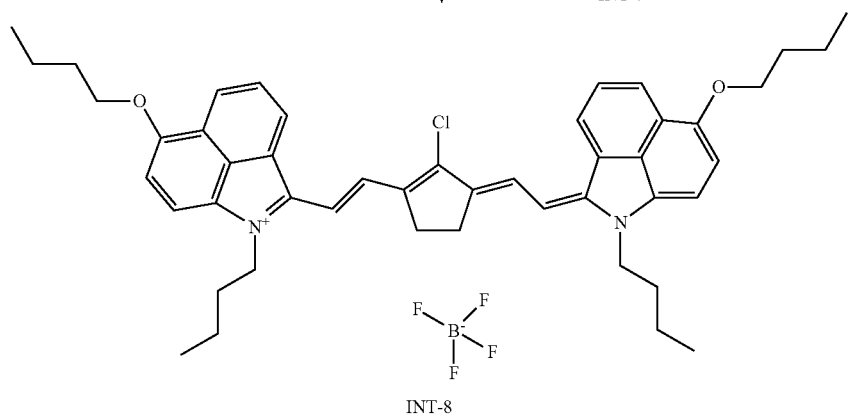
INT-8

The synthesis of intermediate INT-1 was performed as follows: 10 mol of dimethylformamide and 3 mol phosphoryl chloride were heated up to 65° C. Then 1 mol of cyclopentanon was dropped to this mixture. After one hour of stirring at 60° C., the reaction mixture was poured into 2 1 water containing 7 mol sodium acetate.

INT-1 was filtered and dried. The yield was 60%. The compound was analyzed using TLC-chromatography (TLC Silica gel 60 F254; supplied by Merck, eluent: methylene chloride/methanol 90/10, Rf: 0.75).

INT-7 was purchased from Spectrum Info ltd and can be synthesized according to Ukrainskii khimicheskii zhurnal, 74, p105-113, 2008 and the references therein Ukrainskii khimicheskii zhurnal, 73, p120-125, 2007 and U52108879.

To a stirred mixture of 3.83 g INT-7 and 0.86 g INT-1 in methanol (25 ml) at room temperature under nitrogen were added consecutively triethylamine (1 g) and acetic acid (1.8 g). The reaction was stirred for 4 hours at room temperature. The product was isolated by filtration, washed with methanol and methyl t-butyl ether. The product was dried at room temperature under reduced pressure and stored at 4° C. The compound was analyzed using TLC-chromatography (TLC Silica gel 60 F254; supplied by Merck, eluent: methylene chloride/methanol 90/10, Rf: 0.35).

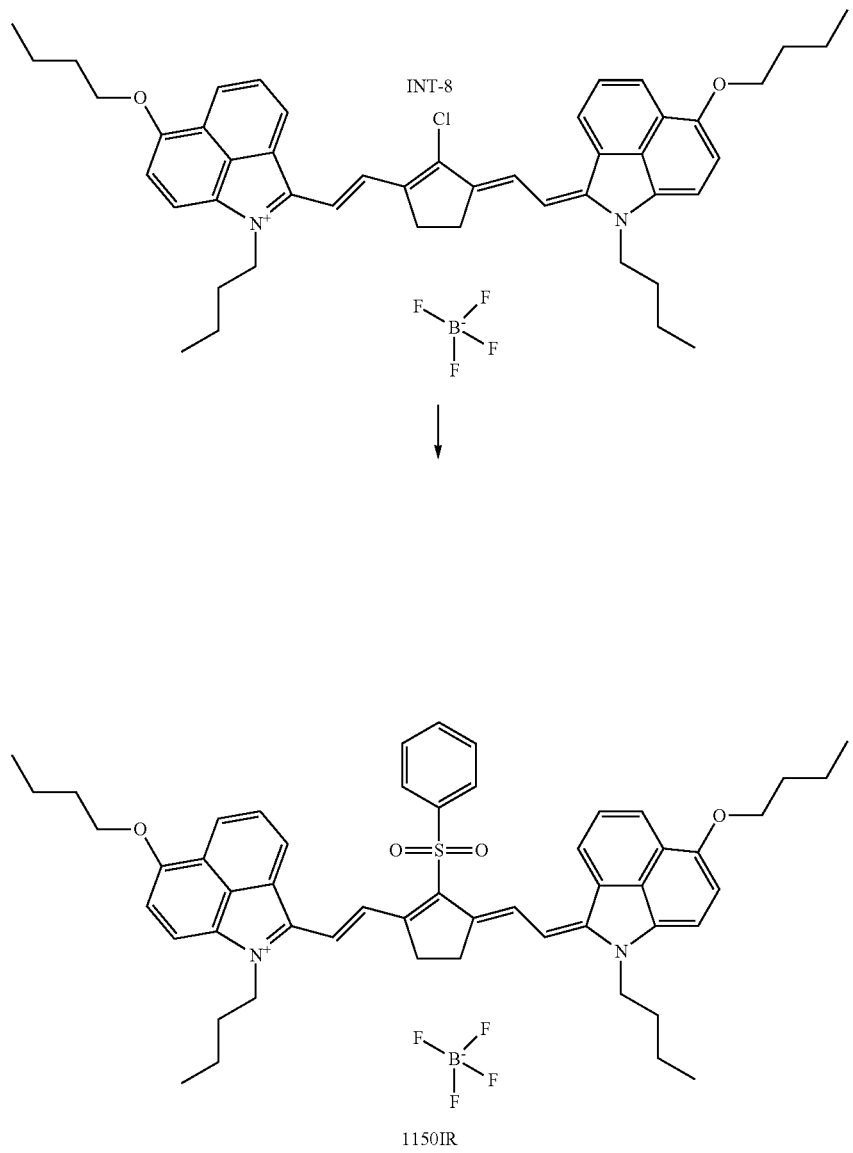

To a stirred suspension of INT-8 (1.6 g) in acetone (15 ml), 0.49 g sodium benzenesulfinate (CASRN873-55-2) and 0.64 g tetrabutyl ammonium bromide was added at room temperature. The suspension was stirred for 1 hour. The product was isolated by filtration and washed with acetone, water and methyl t-butyl ether. The product was dried at room temperature under reduced pressure and stored at 4° C.). The compound was analyzed using TLC-chromatography (TLC Silica gel 60 F254; supplied by Merck, eluent: methylene chloride/methanol 90/10, Rf: 0.4). The absorption maximum of 1150IR measured in $CH_2Cl_2$ including $6.5 \times 10^{-6}$ wt % of methanesulfonic acid was 1193 nm using a SHIMADZU UV-2101 PC spectrophotometer.

920IR is an IR dye prepared as follows:

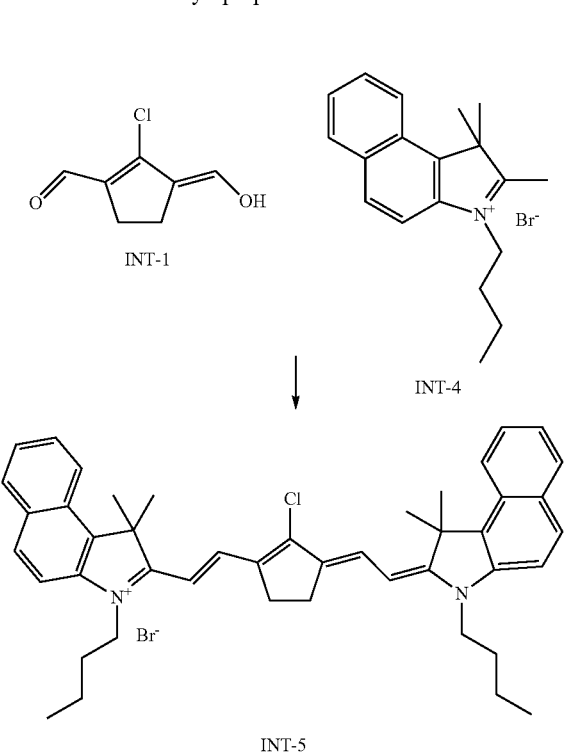

The intermediate INT-1 was prepared in the same manner as described here above. The synthesis of the intermediate INT-4 was performed as described by paragraphs [0097] and [0098] of US20040182268. To a stirred mixture of INT-1 (4.75 g; 30 mmol) and INT-4 (20.8 g; 60 mmol) in ethanol (100 mL) at room temperature were added consecutively triethylamine (12.1 g; 120 mmol) and acetic acid anhydride (2.2 g; 120 mmol). After heating to 50° C. for 1 hour, the reaction mixture was cooled to 20° C. and isopropanol (100 mL) was added. After 1 hour the precipitated IR-absorber was isolated by filtration, washed with EtOAc (20 mL) and dried in vacuo. Yield (crude) of INT-5 was 16 g (73%). The absorption maximum of INT-5 measured in methanol was 844 nm using a SHIMADZU UV-2101 PC spectrophotometer.

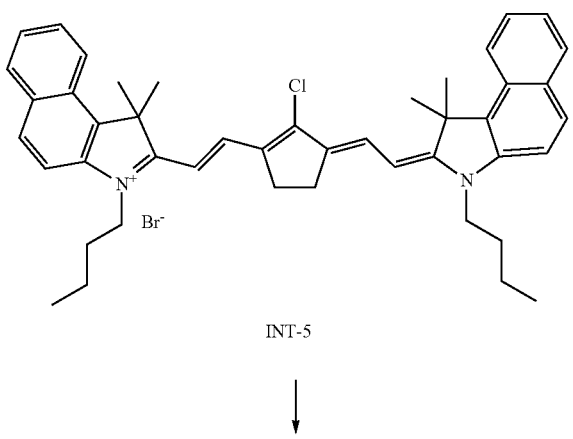

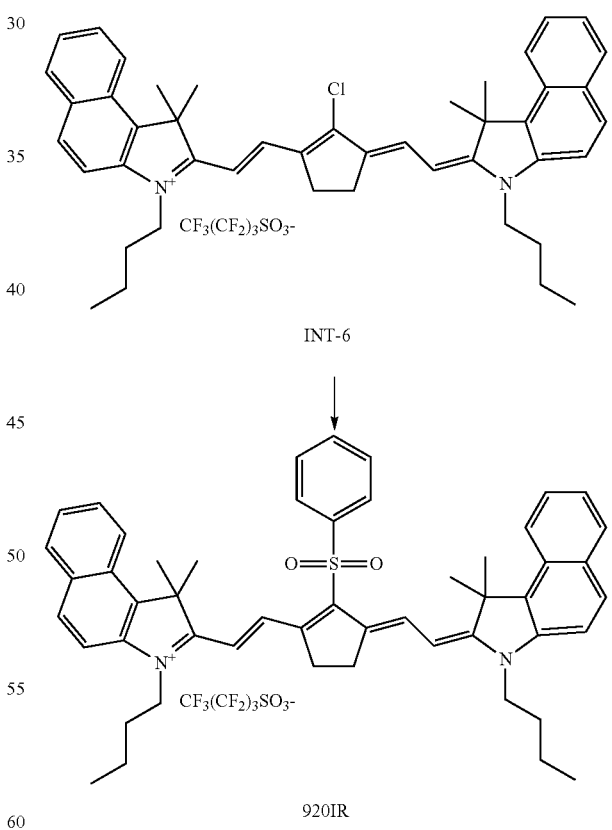

To a stirred suspension of INT-5 (16 g; 22 mmol) in acetonitrile (200 mL) was added potassium nonafluorobutanesulfonate (CASRN29420-49-3 from TCI Europe N.V.; 8.1 g; 24 mmol) and this mixture was heated at 70° C. for 15 minutes. After cooling to room temperature, water (100 mL) was drop wise added and after stirring for 2 hours the precipitated IR-absorber was isolated by filtration, washed consecutively with a mixture of acetonitrile/water 2/1 (20 mL), methyl t-butyl ether (20 mL) and dried in vacuum. The yield of INT-6 was 14 g (67%). The absorption maximum of INT-8 measured in methanol was 844 nm using a SHIMADZU UV-2101 PC spectrophotometer.

To a stirred suspension of INT-6 (1.65 g; 1.73 mmol) in methanol (15 mL) under nitrogen at room temperature was added sodium benzenesulfinate (CASRN873-55-2 from Aldrich; 0.297 g; 1.81 mmol). After stirring for 2 hours the precipitated IR-absorber was isolated by filtration, washed with methyl tert-butyl ether (5 mL) and dried in vacuum.

The yield of 9201R was 1.2 g (65%). The absorption maximum measured in methanol was 910 nm. The absorption maximum of 9201R measured in $CH_2Cl_2$ including $6.5 \times 10^{-6}$ wt % of methanesulfonic acid was 923 nm using a SHIMADZU UV-2101 PC spectrophotometer.

BDISP is a dispersion prepared as follows:

2.1 g Tinuvin 928 (commercially available from BASF), 7.3 g BLD1, 7.3 g BLD2 and 7.3 g BLD3 was added to 32 g ethyl acetate. 23.1 gTakenate D120N was added to the mixture. The mixture was stirred at 70° C. during 10 minutes in order to dissolve the components. The mixture was brought at 30° C. 0.125 g 11501R dissolved in 3 mL methylene chloride was added to the mixture.

In a separate flask, 3 drops of Olfine E1010 were added to 77 g Mowiol 4 88 and 50 mL water.

The ethyl acetate-based solution was added to the aqueous solution. The mixture was emulsified using a T25 digital Ultra-turrax® with a 18N rotor commercially available from IKA at 20000 rpm during 5 minutes.

Ethyl acetate was removed under reduced pressure, some water (20 mL) was also removed. The mixture was split and to one half, tetraethylenepentamine (CASRN112-57-2 from Aldrich) (1.25 g) in 7.75 mL water was added. This mixture was stirred for 20 hours at 65° C. Large particles were removed by filtering the mixture using a cloth filter with 60 µm pores.

MDISP is a dispersion prepared as follows:

9.5 g MLD1, 1.6 g Tinuvin 928, 9.5 g MLD2, 1.7 g MLD3 and 1.7 g YLD1 was added to 32 g ethyl acetate. 23.1 g Takenate D120N was added to the mixture. The mixture was stirred at 70° C. during 10 minutes in order to dissolve the components. The mixture was brought at 30° C. 0.42 g 9201R dissolved in 3 mL methylene chloride was added to the mixture.

In a separate flask, 3 drops of Olfine E1010 were added to 77 g Mowiol 4 88 and 50 mL water.

The ethyl acetate-based solution was added to the aqueous solution. The mixture was emulsified using a T25 digital Ultra-turrax® with a 18N rotor commercially available from IKA at 15000 rpm during 5 minutes.

Ethyl acetate was removed under reduced pressure, some water (20 mL) was also removed. The mixture was split and to one half, 1.25 g tetraethylenepentamine (CASRN112-57-2 from Aldrich) in 7.75 mL water was added. This mixture was stirred for 20 hours at 65° C. Large particles were removed by filtering the mixture using a cloth filter with 60 µm pores.

DEVELOP is a dispersion prepared as follows:

In Pot A, 55 g of Arlo, 4.4 g Proxel Ultra 5 (commercially available from Avecia) and 366.674 MOW were added to 524.601 g water. The mixture was stirred for 5 minutes at 50° C. in order to dissolve all components.

In Pot B, 10.725 g 4,4'-Thiobis(6-tert-butyl-m-cresol) (commercially available from TCI Europe), 10.725 g Ralox 46 (commercially available from Raschig), 33 g Tinuvin 928 (commercially available from BASF), 8.25 g DISFLA-MOLL TKP (commercially available from Lanxess), 4.125 g Ethyl Maleate (commercially available from TCI Europe) and 181.5 g Zinc 3,5-bis(alpha methylbenzyl) salicylate (CASRN53770-52-8, commercially available from Sanko Europe) were added to 495 g Ethyl acetate. The mixture was stirred for 30 minutes at 50° C. in order to dissolve all components.

While Pot A was stirred with a HOMO-REX high speed homogenizing mixer the solution in Pot B was added to Pot A. The mixture was further stirred during 5 minutes with the HOMO-REX mixer. Ethyl acetate was removed from the mixture under reduced pressure.

2-Colour Capsule Material

Preparation of PET-C

A coating composition SUB-1 was prepared by mixing the components according to Table 2 using a dissolver.

TABLE 2

| wt % of components | SUB-1 |
| --- | --- |
| deionized water | 76.66 |
| CCE | 18.45 |
| Resorcinol | 0.98 |
| PAR-sol | 0.57 |
| PEA-sol | 0.68 |
| DOW-sol | 1.33 |
| Surfynsol | 1.33 |

A 1100 µm thick polyethylene terephthalate sheet was first longitudinally stretched and then coated on both sides with the coating composition SUB-1 at a wet coating thickness of 10 µm. After drying, the longitudinally stretched and coated polyethylene terephthalate sheet was transversally stretched to produce a double side subbed 63 µm thick sheet PET-C, which was transparent and glossy.

Preparation of the Laser Markable Laminate LML-01

19.048 g DEVELOP was added to 0.399 g BDISP and 0.553 g of MDISP. The mixture was stirred during 5 minutes at room temperature with a magnetic stirrer. The mixture was coated with an Elcometer Bird Film Applicator (from ELCOMETER INSTRUMENTS) on a PET-C support at a wet coating thickness of 200 µm and dried at 60° C. for 5 minutes in a circulation oven. A schematic representation of LML-01 is shown in FIG. 1.

Preparation of the 2-Colour Capsule Laser Markable Article LMA-01

An assembly was made wherein the Laser Markable Laminate LML-01 was laminated on both sides of the white opaque core support CORE, wherein the coated side of the Laser Markable Laminate faces the white opaque core support CORE. A schematic representation of LMA-01 is shown in FIG. 2.

The lamination was performed using a Photonex-325 LSI laminator at a temperature of 110° C. and speed mode 1.

Evaluation of the 2-Colour Capsule Laser Markable Article LMA-01 Laser Marking

The laser markable article LMA-01 was then laser marked with two infrared lasers each having a different emission wavelength. The optical density of the laser marked areas were measured in reflection using a spectrodensitometer Type GretagMacbeth SPM50 using a visual filter.

A first optically pumped semiconductor laser emitting at 920 nm (Genesis MX 920-4000 MTM from COHERENT) was used for producing a magenta coloured wedge of 0.6 cm×0.6 cm square boxes of increasing optical density up to a maximum optical density of 0.58 in the LMA-01. The COHERENT laser is a continuous wave (cw) laser of which the laser is modulated using a so-called Acousto-Optic Modulator (AOM). The laser was used at a power level of 4.00 W at the sample, a dither of 0.05 mm, a scan speed of 100 mm/s and at a pulse repetition rate of 2 kHz.

A second optically pumped semiconductor laser emitting at 1154 nm (MX 1154-6000 MTM from COHERENT) was used for producing a blue coloured wedge of 0.6 cm×0.6 cm square boxes of increasing optical density up to a maximum optical density of 1.18 in the LMA. The COHERENT laser is a continuous wave (cw) laser of which the laser is modulated using a so-called Acousto-Optic Modulator (AOM). The laser was used at a power level of 4.30 W at the sample, a dither of 0.05 mm, a scan speed of 700 mm/s and at a pulse repetition rate of 80 kHz.

It is clear from these results that two different colours, i.e. magenta and blue, could be created independently from each other in the single laser markable layer of LMA-01.

The invention claimed is:

1. A color laser markable composition comprising:
   a first Diffusion Hindered Molecular Assembly including a first leuco dye and a first sensitizer; and
   a second Diffusion Hindered Molecular Assembly including a second leuco dye and a second sensitizer; wherein
   the first sensitizer and the second sensitizer include infrared absorbing compounds, and an absorption maximum of the infrared absorbing compound in the first sensitizer and an absorption maximum of the infrared absorbing compound in the second sensitizer differ by at least 150 nm.

2. The color laser markable composition according to claim 1, wherein the infrared absorbing compound in the first sensitizer includes an infrared absorbing dye and the infrared absorbing compound in the second sensitizer includes an infrared absorbing pigment.

3. The color laser markable composition according to claim 1, wherein each of the first and second Diffusion Hindered Molecular Assemblies includes a capsule defined by a polymeric shell surrounding a core containing the first and second leuco dyes and the first and second sensitizers, respectively.

4. The color laser markable composition according to claim 1, wherein each of the first and second Diffusion Hindered Molecular Assemblies includes a polymer particle charged with the first and second leuco dyes and the first and second sensitizers, respectively.

5. The color laser markable composition according to claim 1, wherein each of the first and second Diffusion Hindered Molecular Assemblies is a composite particle dispersion containing the first and second leuco dyes and the first and second sensitizers, respectively.

6. The color laser markable composition according to claim 1, further comprising at least one of a developer and a thermal acid generator.

7. The color laser markable composition according to claim 1, further comprising a third Diffusion Hindered Molecular Assembly including a third leuco dye and a third sensitizer.

8. The color laser markable composition according to claim 1, wherein the color laser markable composition is an aqueous composition.

9. The color laser markable composition according to claim 8, wherein the aqueous composition is an inkjet ink.

10. A color laser markable article comprising:
    a support; and
    the color laser markable composition as defined in claim 1 disposed on the support and defining a single laser markable layer on the support.

11. A method of preparing a color laser marked article comprising the steps of:
    providing the color laser markable article as defined in claim 10; and
    color laser marking the color laser markable article using at least a first laser and a second laser; wherein
    the first laser and the second laser have different emission wavelengths or have different operation modes.

12. The method of preparing a color laser marked article according to claim 11, wherein the emission wavelengths of the first laser and the second laser differ by at least 150 nm.

* * * * *